(12) United States Patent
Kim et al.

(10) Patent No.: US 11,412,308 B2
(45) Date of Patent: Aug. 9, 2022

(54) METHOD FOR PROVIDING RECOMMENDED CHANNEL LIST, AND DISPLAY DEVICE ACCORDING THERETO

(71) Applicant: SAMSUNG ELECTRONICS CO., LTD., Suwon-si (KR)

(72) Inventors: Sungwon Kim, Suwon-si (KR); Youngjoon Yoo, Suwon-si (KR); Dosung Kim, Suwon-si (KR); Injune Baek, Suwon-si (KR); Bongseok Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/261,461

(22) PCT Filed: Jul. 19, 2019

(86) PCT No.: PCT/KR2019/008964
§ 371 (c)(1),
(2) Date: Jan. 19, 2021

(87) PCT Pub. No.: WO2020/017930
PCT Pub. Date: Jan. 23, 2020

(65) Prior Publication Data
US 2021/0345005 A1    Nov. 4, 2021

(30) Foreign Application Priority Data
Jul. 19, 2018   (KR) .................. 10-2018-0084277

(51) Int. Cl.
*H04N 21/482* (2011.01)
*H04N 21/258* (2011.01)
(Continued)

(52) U.S. Cl.
CPC ... *H04N 21/4826* (2013.01); *H04N 21/25891* (2013.01); *H04N 21/4314* (2013.01);
(Continued)

(58) Field of Classification Search
CPC .......... H04N 21/4826; H04N 21/4532; H04N 21/4314; H04N 21/4755; H04N 21/25891; H04N 21/4668
See application file for complete search history.

(56) References Cited

U.S. PATENT DOCUMENTS 5,798,785 A * 8/1998 Hendricks .............. H04H 20/42
                                                                    725/46
5,977,964 A * 11/1999 Williams ................. H04N 7/10
                                                                    715/721
(Continued)

FOREIGN PATENT DOCUMENTS

JP    2007-281927 A    10/2007
KR    10-1438764 B1     9/2014
(Continued)

OTHER PUBLICATIONS

Communication dated Oct. 23, 2019 issued by the International Searching Authority in counterpart Application No. PCT/KR2019/008964 (PCT/ISA/220, PCT/ISA/210, and PCT/ISA/237).
(Continued)

*Primary Examiner* — Fernando Alcon
(74) *Attorney, Agent, or Firm* — Sughrue Mion, PLLC

(57) ABSTRACT

A method of providing a recommendation channel list according to an embodiment of the present disclosure allows a user to quickly and conveniently select desired content and includes: acquiring viewing history information including information about a viewing time, a channel, and a genre of content that a user viewed on a display device for a first period; in response to a preset event being occurred, gen-
(Continued)

erating, based on the viewing history information, a recommendation channel list including at least one channel from among at least one first recommended channel related to at least one channel viewed by the user and at least one second recommended channel related to at least one genre of content viewed by the user; and displaying a screen including the recommendation channel list.

17 Claims, 15 Drawing Sheets

(51) Int. Cl.
    *H04N 21/431* (2011.01)
    *H04N 21/45* (2011.01)
    *H04N 21/466* (2011.01)
    *H04N 21/475* (2011.01)

(52) U.S. Cl.
    CPC ..... *H04N 21/4532* (2013.01); *H04N 21/4668* (2013.01); *H04N 21/4755* (2013.01)

(56) References Cited

U.S. PATENT DOCUMENTS

| | | | |
|---|---|---|---|
| 8,370,874 B1* | 2/2013 | Chang | H04N 21/4821 725/47 |
| 9,473,730 B1* | 10/2016 | Roy | H04H 60/45 |
| 10,057,648 B1* | 8/2018 | Harijan | H04N 21/466 |
| 10,097,895 B2 | 10/2018 | Han et al. | |
| 10,349,137 B2 | 7/2019 | Kim | |
| 10,397,659 B1* | 8/2019 | Ling | H04N 21/4334 |
| 2002/0083451 A1* | 6/2002 | Gill | H04N 21/8586 725/46 |
| 2002/0104081 A1* | 8/2002 | Candelore | H04N 21/44222 725/9 |
| 2002/0129368 A1* | 9/2002 | Schlack | H04N 21/4661 725/46 |
| 2002/0199193 A1 | 12/2002 | Gogoi et al. | |
| 2007/0016931 A1 | 1/2007 | Ichioka et al. | |
| 2007/0174862 A1 | 7/2007 | Kushida et al. | |
| 2009/0075583 A1* | 3/2009 | Son | H04N 7/17318 455/3.01 |
| 2009/0228424 A1* | 9/2009 | Mori | H04N 21/4668 706/54 |
| 2009/0271822 A1* | 10/2009 | Lee | G06F 16/7867 725/38 |
| 2009/0292672 A1* | 11/2009 | Kunjithapatham | H04N 21/4668 |
| 2011/0047568 A1 | 2/2011 | Yeh et al. | |
| 2011/0154399 A1* | 6/2011 | Jin | H04N 21/44213 725/46 |
| 2012/0331494 A1 | 12/2012 | Pontual et al. | |
| 2015/0172764 A1 | 6/2015 | Chae et al. | |
| 2016/0112761 A1* | 4/2016 | Venkataraman | H04N 21/252 725/14 |
| 2016/0364094 A1 | 12/2016 | Shin et al. | |
| 2018/0020258 A1* | 1/2018 | Jeon | H04N 21/4667 |
| 2019/0026790 A1* | 1/2019 | Bayer | H04N 21/2665 |
| 2020/0175398 A1 | 6/2020 | Kim et al. | |
| 2020/0382844 A1* | 12/2020 | Brehm | H04N 21/454 |

FOREIGN PATENT DOCUMENTS

| | | | |
|---|---|---|---|
| KR | 10-2015-0042584 A | 4/2015 | |
| KR | 10-2015-0055410 A | 5/2015 | |
| KR | 10-2015-0071139 A | 6/2015 | |
| KR | 10-2015-0101338 A | 9/2015 | |
| KR | 10-2016-0145351 A | 12/2016 | |
| KR | 10-2019-0013348 A | 2/2019 | |

OTHER PUBLICATIONS

Communication dated Aug. 31, 2021, issued by the European Patent Office in counterpart European Application No. 19837937.2.

* cited by examiner

FIG. 5A

| Time | Mon | Tue | Wed | Thu | Fri | Sat | Sun |
|---|---|---|---|---|---|---|---|
| 18:00~19:00 | | CB* | CB* | CB* | | FO* | ESP* |
| 19:00~20:00 | | ESP* | | | | FO* | ESP* |
| 20:00~21:00 | ESP* | ESP* | TN* | ESP* | ESP* | | |
| 21:00~22:00 | | | | | CB* | | |
| 22:00~23:00 | Golf | Golf | | | | | |

FIG. 5B

| Time | Mon | Tue | Wed | Thu | Fri | Sat | Sun |
|---|---|---|---|---|---|---|---|
| 18:00~19:00 | | CB* | ESP* | CB* | | FO* | ESP* |
| 19:00~20:00 | | | | | | FO* | ESP* |
| 20:00~21:00 | CB* | ESP* | | TN* | ESP* | | |
| 21:00~22:00 | | ESP* | | CB* | | | |
| 22:00~23:00 | Golf | Golf | | | | | |

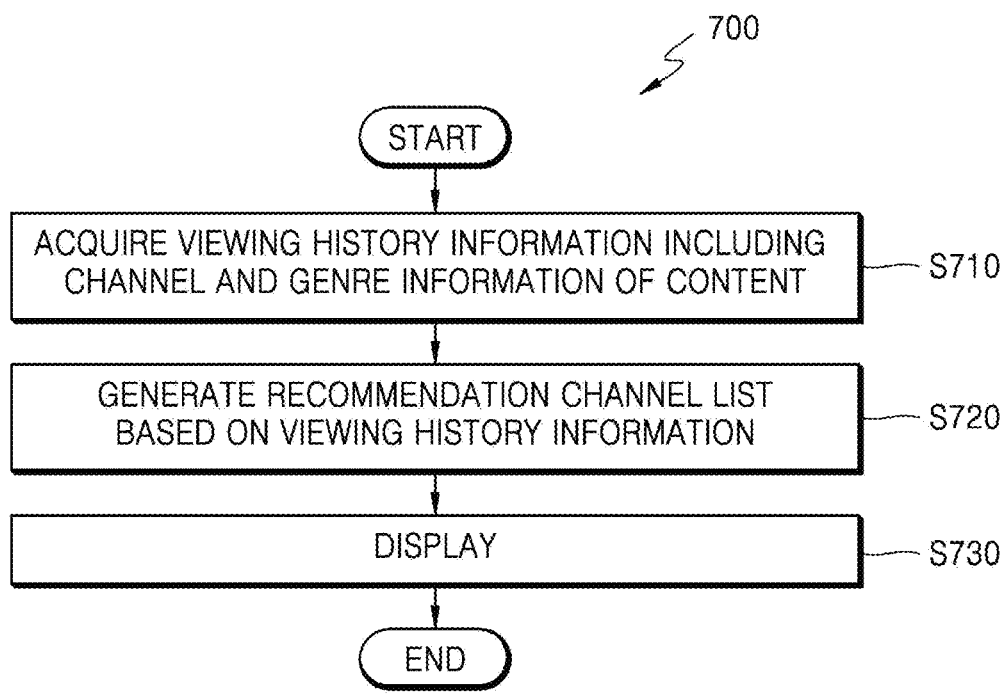

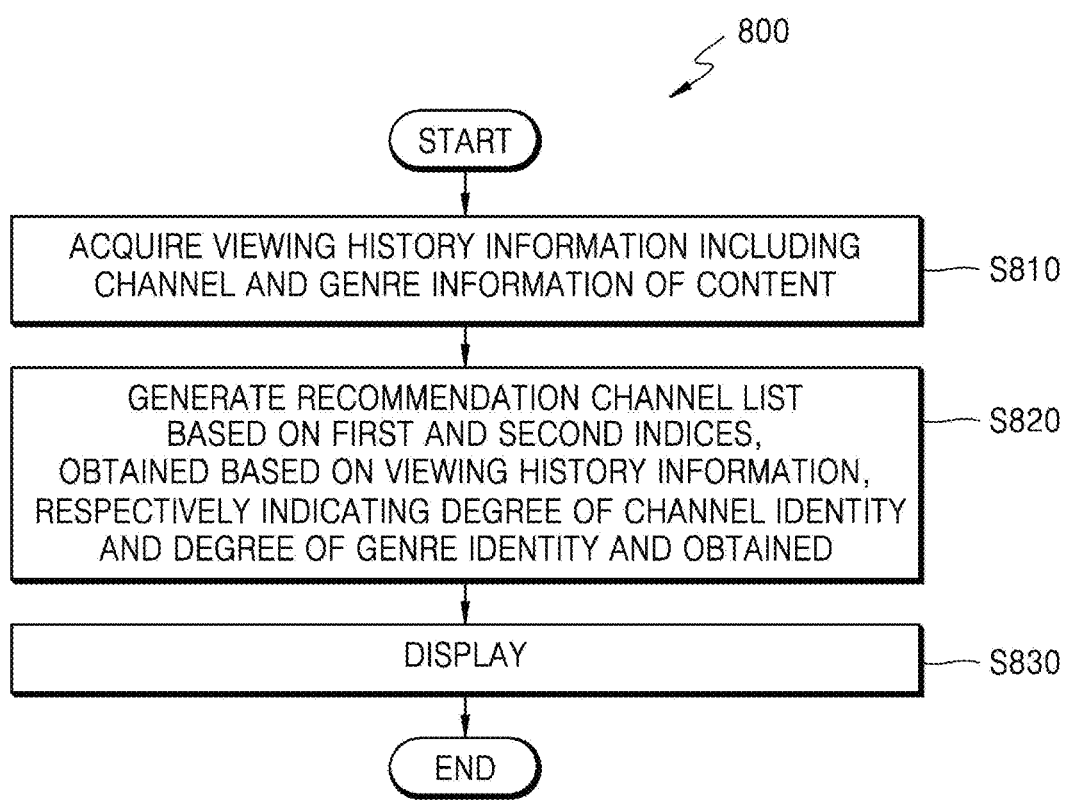

METHOD FOR PROVIDING RECOMMENDED CHANNEL LIST, AND DISPLAY DEVICE ACCORDING THERETO

TECHNICAL FIELD

The present disclosure relates to a method of providing a list of recommended channels and a display device for performing the method.

In particular, the present disclosure relates to a method of providing a recommendation channel list to increase user satisfaction based on a user's viewing history and a display device for performing the method.

BACKGROUND ART

Due to the widespread use of displays and technological advancements therefor, display devices that have various shapes and functions are being developed.

Accordingly, functions that meet a consumer's various desires or intentions by using such display devices may be realized.

A display device may be connected to various wired and wireless communication networks to receive at least one of a plurality of pieces of content via a connected communication network. In recent years, types and number of pieces of content that are displayable on a display device have become very diverse. In detail, a display device may receive, via a communication module (not shown) provided therein, at least one of a plurality of pieces of content transmitted by channels respectively corresponding to a plurality of broadcasting stations. Furthermore, the display device may access at least one server via the Internet and receive at least one piece of content transmitted by the at least one server. In addition, the display device may select, receive, and display at least one of many different types of pieces of content transmitted by an external device connected via various wired/wireless networks, such as a broadcasting station server, an Internet server, a content server, a content providing device, or a content storage device.

As the types and number of pieces of content that are to be selectively received and displayed by the display device increase as described above, the user may experience inconvenience in selecting any one of numerous pieces of content.

Thus, it is necessary to generate and provide a content recommendation list such that a user who views certain content on a display device may quickly select desired content.

DESCRIPTION OF EMBODIMENTS

Technical Problem

Embodiments of the present disclosure are to provide a method of providing a recommendation channel list so that a user may quickly and conveniently select desired content and a display device employing the method.

In particular, embodiments of the present disclosure are to provide a method of providing a recommendation channel list and a display device employing the method, which allow the user to quickly and conveniently select desired content by generating the list of recommended channels considering both a channel and a genre of content that the user has viewed.

Solution to Problem

In a method of providing a list of recommended lists and a display device for performing the method according to embodiments of the disclosure, channels that a user is more likely to prefer may be preferentially recommended by generating the list of recommended channels considering both a genre and a channel for content that the user has viewed.

ADVANTAGEOUS EFFECTS OF DISCLOSURE

A method of providing a recommendation channel list and a display device employing the method according to embodiments of the disclosure allow preferential recommendation of channels that the user is more likely to prefer by generating the list of recommended channels considering both a genre and a channel for content that the user has viewed.

Accordingly, a method for providing a recommendation channel list and a display device employing the method according to the embodiments of the disclosure allow the user to quickly and conveniently select a desired channel.

BRIEF DESCRIPTION OF DRAWINGS

FIG. 5A illustrates a users viewing history in a first week of a specific month.

FIG. 5B illustrates a user's viewing history in a second week of a certain month.

FIG. 7 is a flowchart for explaining operations performed by a display device, according to a disclosed embodiment.

FIG. 8 is another flowchart for explaining operations performed by a display device, according to a disclosed embodiment.

BEST MODE

Figure 1:
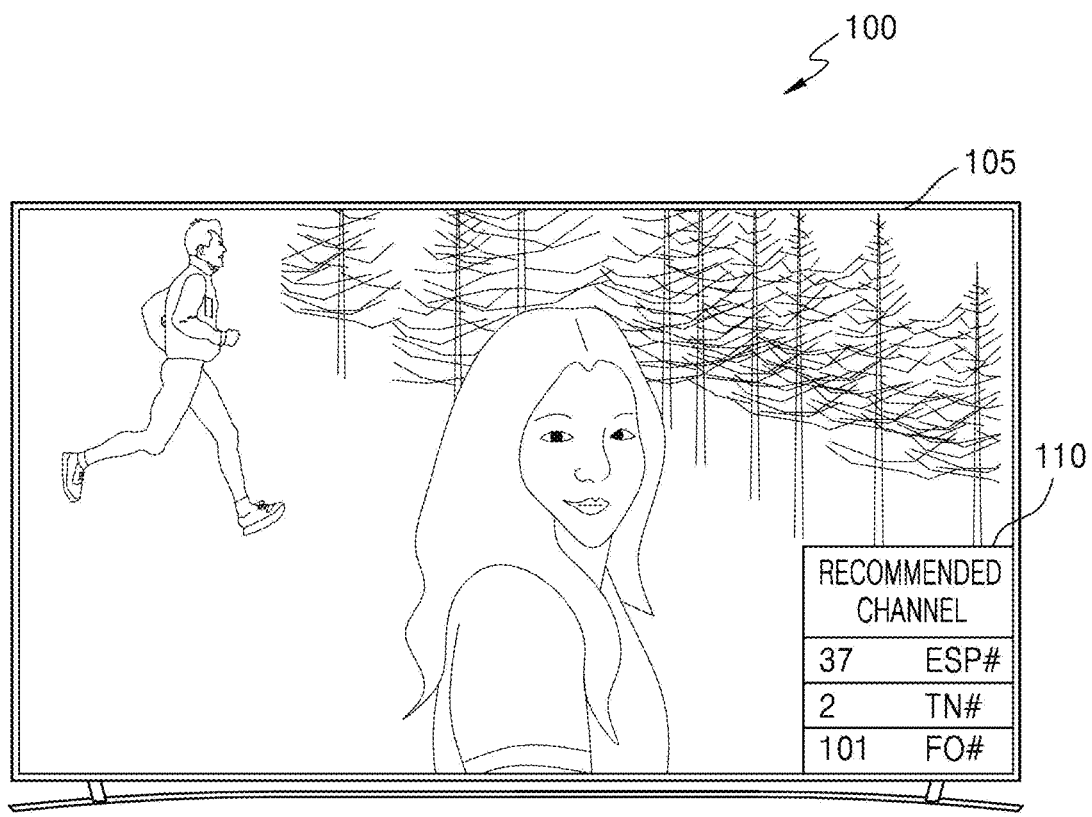
FIG. 1 is a diagram illustrating a display device for providing a recommendation channel list.

According to an embodiment of the disclosure, a method of providing a recommendation channel list includes: acquiring viewing history information including information about a viewing time, a channel, and a genre of content that a user viewed on a display device for a first period; in response to an event being occurred, generating, based on the viewing history information, a recommendation channel list including at least one channel from among at least one first recommended channel related to at least one channel viewed by the user and at least one second recommended channel related to at least one genre of content viewed by the user; and displaying a screen including the recommendation channel list.

The recommendation channel list may be generated based on a degree of genre identity and degree of channel identity with respect to at least one piece of content that the user viewed.

The generating of the recommendation channel list may include: comparing the degree of channel identity with the degree of genre identity and selecting, based on a result of the comparing, at least one channel from among the at least one first recommended channel and the at least one second recommended channel; and generating the recommendation channel list including the selected at least one channel.

The generating of the recommendation channel list may include: obtaining, based on the viewing history information, a first index indicating a degree of channel identity with respect to at least one piece of content that the user viewed and a second index indicating a degree of genre identity with respect to at least one piece of content that the user viewed; selecting, based on the first and second indices, at least one channel from among the at least one first recommended channel and the at least one second recommended channel; and generating the recommendation channel list including the selected at least one channel.

The first index may be information numerically indicating a degree of channel identity existing between at least one piece of content that the user viewed in the same time period on the same day of the week, and the second index may be information numerically indicating a degree of genre identity existing between at least one piece of content that the user viewed in the same period on the same day of the week.

The selecting of the at least one channel may include comparing the first index with the second index and adjusting, based on a result of the comparing, the number of channels that are selected among the at least one first recommended channel and the number of channels that are selected among the at least one second recommended channel.

The selecting of the at least one channel may include, when the first index has a value that is greater than or equal to or exceeds a threshold value, selecting at least one channel to be included in the recommendation channel list from among the at least one first recommended channel.

The selecting of the at least one channel may include, when the second index has a value that is greater than or equal to or exceeds a threshold value, selecting at least one channel to be included in the recommendation channel list from among the at least one second recommended channel.

The selecting of the at least one channel may include, when each of the first and second indices has a value that is greater than or equal to or exceeds a threshold value, determining the number of channels to be selected from among the at least one first channel based on the value of the first index and the number of channels to be selected from among the at least one second channel based on the value of the second index.

The generating of the recommendation channel list may include, when the viewing time for the first period is less than or equal to a threshold time, generating the recommended channel based on a genre corresponding to content that the user viewed.

According to another embodiment of the disclosure, a display device includes: a display; a communicator configured to receive at least one of a plurality of pieces of content respectively corresponding to a plurality of channels; a memory storing one or more instructions; and a controller including at least one processor configured to execute at least one of the one or more instructions. The controller acquires viewing history information including information about a viewing time, a channel, and a genre of content that a user viewed for a first period. in response to an event being occurred, the controller also generates, based on the viewing history information, a recommendation channel list including at least one channel from among at least one first recommended channel related to at least one channel viewed by the user and at least one second recommended channel related to at least one genre of content viewed by the user and control a screen including the recommendation channel list to be output on the display.

Mode of Disclosure

Embodiments of the present disclosure will now be described more fully hereinafter with reference to the accompanying drawings so that they may be easily implemented by those of ordinary skill in the art to which the present disclosure pertains. However, embodiments of the present disclosure may have different forms and should not be construed as being limited to the embodiments set forth herein. In addition, parts not related to descriptions of the present disclosure are omitted to clearly explain embodiments of the present disclosure in the drawings, and like reference numerals denote like elements throughout.

Throughout the specification, it will be understood that when a part is referred to as being "connected" or "coupled" to another part, the part can be directly connected to or electrically coupled to the other part with one or more intervening elements interposed therebetween. Furthermore, when a part "includes" or "comprises" an element, unless there is a particular description contrary thereto, the part can further include other elements, not excluding the other elements.

Expressions such as "in some embodiments" or "in an embodiment" described in various parts of this specification do not necessarily refer to the same embodiment(s).

Some embodiments may be described in terms of functional block components and various processing operations. Some or all of such functional blocks may be implemented by any number of hardware and/or software components that perform specific functions. For example, functional blocks of the present disclosure may be implemented by one or more microprocessors or by circuit components for performing certain functions. For example, functional blocks according to the present disclosure may be implemented with any programming or scripting language. The functional blocks may be implemented using algorithms executed on one or more processors. Furthermore, the present disclosure may employ techniques of the related art for electronics configuration, signal processing and/or data processing. The terms such as "module" and "configuration" may be used in a broad sense and are not limited to mechanical or physical components.

Furthermore, connecting lines or connectors shown in figures are intended to represent exemplary functional relationships and/or physical or logical couplings between components in the figures. In an actual device, connections between components may be represented by alternative or additional functional relationships, physical connections, or logical connections.

Furthermore, the expression "at least one of a and b" indicates 'a or b' or 'both a and b'.

Hereinafter, the present disclosure will be described in detail with reference to the accompanying drawings.

According to an embodiment of the present disclosure, a display device may include any electronic device that visually outputs certain content. In detail, according to an embodiment of the present disclosure, the display device may be any electronic device capable of selectively displaying at least one piece of content and may come in different forms such as a television (TV), a digital broadcasting terminal, a tablet PC, a smartphone, a mobile phone, a computer, and a notebook. Furthermore, the display device (100 of FIG. 1) may be of not only a fixed type but also a movable type or user portable type.

According to an embodiment of the disclosure, the display device displays, on a screen, a recommendation channel list recommendation channel list including channels that a user prefers or is more likely to view based on a user's viewing history. Accordingly, the user may quickly and conveniently select and view a desired channel among multiple channels.

FIG. 1 is a diagram illustrating a display device 100 for providing a recommendation channel list.

The display device 100 may output a recommendation channel list 110 on a screen 105. The recommendation channel list 110 may be generated using various methods and analysis techniques.

For example, the display device 100 may analyze the user's viewing history to extract channels that the user has frequently watched and generate the recommendation channel list 110 by using the extracted channels. Accordingly, the recommendation channel list 110 may be a channel list including channels that the user has frequently viewed by using the user's viewing history. Here, the viewing history is a record of the user's viewing content or a channel on the display device 100 for a first period and may include information about a channel matching at least one of a day of the week, date, and time.

For example, the display device 100 may be a TV.

In this case, the user may turn on the display device 100 to view certain content (e.g., the news transmitted through a specific channel, etc.) at 8 pm on Thursday. Then, the display device 100 may output the recommendation channel list 110 immediately after being turned on.

In general, the viewing history may be 'viewing channel information for each time period', which is information about channels that the user viewed on the display device 100 for each time period. When a recommendation channel list is generated based on viewing channel information for each time period, it may be effective to inform a channel preferred by the user at a specific time period. However, according to this method, it a channel that the user is likely to be interested in or prefer although not included in the viewing history may be recommended.

As types of a content provider and methods of providing content become more diverse, the number of channels that are selectable and viewable on the display device 100 is further increasing. In addition, types of content that is selectable and viewable on the display device 100 are becoming increasingly more diverse. Accordingly, it has been difficult for the user to know which pieces of content are provided via channels that are selectable and viewable on the display device 100, and there has been no opportunity for the user to be provided with information about viewable pieces of content.

As described above, when a recommendation channel list is generated based on viewing channel information for each hourly period, this makes it difficult to recommend channels having no viewing history and has a limitation in that the recommendation channel list is of little help in selecting new content that the user is likely to be interested in.

In an embodiment of the disclosure, as described above, by overcoming problems or limitations from generating a recommendation channel list based on viewing channel information for each time period, a channel that the user has not viewed but is likely to be interested in may be recommended.

A method for providing a recommendation channel list according to an embodiment of the disclosure and a detailed configuration and operations of a display device employing the method will be described in detail below with reference to the accompanying drawings.

Figure 2:
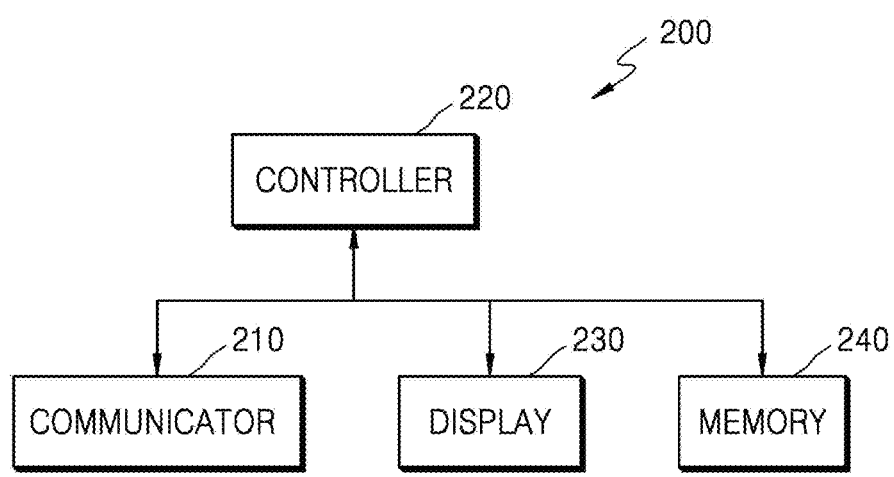
FIG. 2 is a block diagram of a display device according to an embodiment of the present disclosure.

FIG. 2 is a block diagram of a display device 200 according to an embodiment of the present disclosure.

Referring to FIG. 2, the display device 200 according to the disclosed embodiment includes at least one communicator 210 for performing communication with an external device (not shown), a controller 220 including at least one processor (not shown) for executing one or more instructions, a display 230, and a memory 240.

The communicator 210 may receive at least one piece of certain content transmitted through a certain channel by performing communication with the external device. In detail, the communicator 210 may receive at least one of a plurality of pieces of content corresponding to a plurality of channels. Here, the channel may be a broadcast channel. Furthermore, a channel may refer to, in addition to the broadcast channel, a content transmission path corresponding to a content provider that transmits certain content. For example, the channel may refer to, in addition to the broadcast channel, a transmission path through which a video on demand (VoD) service and/or a streaming content providing service are/is transmitted and may be represented like the broadcast channel, i.e., in the form of a number, a character, or a combination of the character and the number. For example, the communicator 210 may receive a streaming movie providing service via channel '20', and a user of the display device 200 may view movie content provided by the streaming movie providing service when selecting channel '20'.

The communicator 210 may communicate with external devices (not shown) through a wired or wireless network. In this case, an external device may be a device capable of transmitting certain content to the display device 200 through a preset channel and may include a broadcasting station server, a content provider server, a content storage device, etc.

According to an embodiment, the communicator 210 may include at least one communication module, such as a short-range communication module, a wired communication module, a mobile communication module, a broadcast receiving module, etc. Here, the at least one communication module may include at least one from among a tuner for performing broadcast reception or a communication module capable of performing data transmission and reception via a network that conforms to communication standards such as Bluetooth, wireless local area network (WLAN) (or Wi-Fi), wireless broadband (Wibro), World Interoperability for Microwave Access (Wimax), code division multiple access (CDMA), wide-band CDMA (WCDMA), etc.

The memory 240 stores one or more instructions.

Furthermore, the memory 240 may store, according to control by the controller 220, viewing history information including information about a viewing time, a channel, and a genre of content that the user viewed for a first period. In this case, the viewing history information is information showing a genre and a viewing time for a channel that the user of the display device 200 viewed for the first period before a current time point.

The controller 220 may control the viewing history information to be obtained.

In detail, when the display device 200 displays content corresponding to a certain channel, the controller 220 may control a user's viewing history corresponding thereto to be stored in the memory 240. Furthermore, when a viewing time is too short, it may be difficult to determine that the user viewed the content. Thus, when the viewing time for the channel is greater than or equal to or exceeds a first time such as a preset time (e.g., 20 or 30 minutes), the controller 220 may store, in the memory 240, a viewing history for the channel displayed for the preset time or more.

Furthermore, the first period may be a period corresponding to the last several days or the last several weeks relative to the current time point. For example, the viewing history information may include information about a viewing time, a genre, and a channel for content that the user viewed in the last two weeks, the last three weeks, or the last four weeks relative to the current time point.

A genre may include information indicating a type of the content and may be a classification range for classifying image content. For example, genres may be classified as sports, film, drama, music, news, lifestyle, documentaries, children's animation, entertainment, etc. In more detail, genres may be divided into sub-genres, and a sports genre may be classified into baseball, soccer, golf, etc.

In other words, in an embodiment of the disclosure, the viewing history information may include information about a channel that the user viewed for each time, which is matched to a genre.

In addition, when a plurality of users use the display device 200, the viewing history information may be obtained for each of the plurality of users. For example, when a family has a TV which is the display device 200 in the house, all members of the family may view content on the display device 200. When the family has a total of three (3) members including a mother, a father, and a child, the display device 200 may individually recognize its users. The display device 200 may obtain and store a viewing history for each of the mother, the father, and the child. In this case, the display device 200 may distinguish and recognize users by performing operations such as voice recognition and user authentication.

The viewing history information will be described in more detail below with reference to FIGS. 5A through 6B.

Furthermore, the memory 240 may include at least one type of storage medium from among a flash memory-type memory, a hard disk-type memory, a multimedia card micro-type memory, a card-type memory (e.g., an SD card or an XD memory), random access memory (RAM), static RAM (SRAM), read-only memory (ROM), electrically erasable programmable ROM (EEPROM), PROM, a magnetic memory, a magnetic disc, and an optical disc.

The display 230 may output an image corresponding to video data via a display panel incorporated therein such that the user may visually recognize the video data.

The controller 220 may include at least one processor (not shown) for executing the at least one instruction. In this case, each of the at least one processor may perform a certain operation by executing at least one of the one or more instructions stored in the memory 240.

Furthermore, each of the at least one processor may perform a certain operation by executing at least one of the one or more instructions stored in the controller 220.

Furthermore, the at least one processor included in the controller 220 may control operations performed by the display device 200 and control the other components included in the display device 200 so that a certain operation is performed. Thus, although it is described below that the controller 220 controls certain operations to be performed, it is obvious that the at least one processor included in the controller 220 may control the certain operations to be performed.

In addition, the controller 220 may include an internal memory (not shown) and at least one processor (not shown) for executing at least one program stored in the internal memory. In detail, the internal memory of the controller 220 may store one or more instructions. The at least one processor included in the controller 220 may perform a certain operation by executing at least one of the one or more instructions stored in the internal memory of the controller 220.

In detail, the controller 220 may include RAM (not shown) that stores signals or data input from outside of the display device 200 or is used as a storage area corresponding to various operations performed by the display device 200, ROM (not shown) storing a plurality of instructions and/or a control program for controlling the display device 200, and at least one processor (not shown). The processor may include a graphics processing unit (GPU) (not shown) for processing graphics corresponding to video. The processor may be implemented as a system on chip (SOC) in which a core (not shown) is integrated with the GPU. The processor may have a single core, a dual core, a triple core, a quad core, or a multiple number of cores therein.

For convenience of explanation, an example in which, when the controller 220 performs or controls a certain operation, the processor of the controller 220 performs the certain operation by executing at least one instruction stored in the memory 240 will be described below.

In an embodiment of the disclosure, when an event occurs, the controller 220 may generate, based on viewing history information, a recommendation channel list including at least one channel from among at least one first recommended channel related to at least one channel viewed by the user and at least one second recommended channel related to at least one genre of content viewed by the user and control a screen including the recommendation channel list to be output on the display 230.

Furthermore, the viewing history information stored in the memory 240 may be continuously updated and stored over time. For example, the controller 220 may update the viewing history information for every preset time period or for every time point when an event occurs such that a user's viewing history for previous preset time intervals relative to a time point when the event is input is stored in the memory 240. Alternatively, the controller 220 may update the viewing history information each time a user's viewing history occurs.

In addition, the viewing history information may be reflected and updated as a user's viewing history of content only when the content has been viewed for a preset time or more. For example, when the user views a certain channel for a short time, e.g., for 5 minutes or less or 10 minutes or less, this user viewing of the certain channel is not regarded as being meaningful. Thus, when a user's viewing time is a preset time or more, e.g., 20 minutes or more or 30 minutes or more, the viewing history information may be reflected as a user's viewing history.

Here, the first recommended channel may be a channel related to at least one channel that the user viewed at a time point or time corresponding to a time point or time when an event occurs. Specifically, the first recommended channel may be at least one channel itself for which a user's viewing history exists. Furthermore, the first recommended channel may be at least one channel selected according to the order of a user's viewing time from among channels that the user viewed.

Furthermore, the second recommended channel may be a channel related to a genre of content provided from at least one channel that the user viewed at a time point or time corresponding to a time point or time when an event occurs. Specifically, the second recommended channel may be at least one channel that provides content of the same or similar genre to content provided through a channel for which a user's viewing history exists.

In addition, each of the first and second recommended channels may be selected from among all channels that are receivable by the display device 200.

In an embodiment of the disclosure, the controller 220 may largely classify a user's viewing patterns into four patterns based on information about a viewing time, a channel, and a genre of content that the user viewed. In this case, the 'viewing time' may be a concept including not only a concept of simple time but also a concept of time included in a date, a day of the week, and/or 24 hours a day. Specifically, the user's viewing patterns may be classified into (i) preferential viewing of a specific channel at a specific time, (ii) preferential viewing of content in a specific genre at a specific time, (iii) preferential viewing of a specific channel in a specific genre at a specific time, and (iv) viewing for a very short time such that total viewing time in the preset time period is less than a threshold time. The controller 220 may also include recommended channels optimized for each user in a recommendation channel list according to the user's viewing pattern.

In an embodiment of the disclosure, the controller 220 may consider, based on viewing history information including information about a viewing time, a genre, and a channel of content that the user viewed, at least one second recommended channel related to the genre of the content that the user viewed as a channel included in the recommendation channel list. Accordingly, even for a channel for which the user's viewing history does not exist, it is possible to recommend a channel belonging to a genre favored by the user, thereby increasing user satisfaction.

Figure 3:
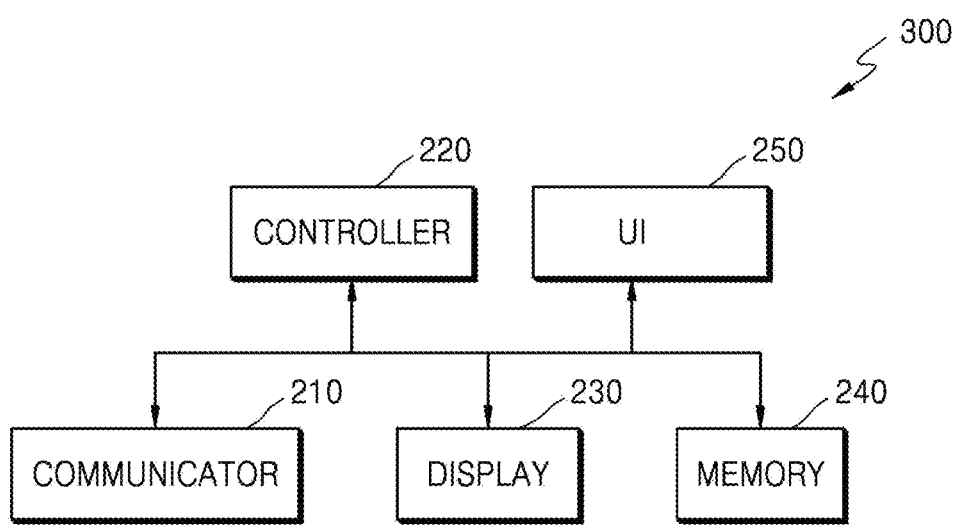
FIG. 3 is a block diagram of a display device according to another embodiment of the present disclosure.

FIG. 3 is a block diagram of a display device 300 according to another embodiment of the present disclosure.

The display device 300 illustrated in FIG. 3 corresponds to the display device 200 illustrated in FIG. 2. Since the same elements of the display device 300 shown in FIG. 3 as those in the display devices 200 are represented by the same reference numerals, descriptions that are already provided above with respect to FIGS. 1 and 2 will be omitted from the description of the display device 300. Referring to FIG. 3, the display device 300 may further include a user interface (UI) 250 in comparison to the display device 200.

The UI 250 may receive a user input for controlling the display device 300. The UI 250 may include, but is not limited to, a user input device including a touch panel for sensing a user's touch, a button for receiving a user's push operation, a wheel for receiving a user's rotation operation, a keyboard, a dome switch, etc. In addition, when the display device 300 is manipulated by a remote controller (not shown), the UI 250 may receive a control signal from the remote controller.

In an embodiment of the disclosure, when a user input for generating a certain event is received, the UI 250 may transmit the user input to the controller 220. For example, the certain event may be an event for turning the display device 300 on, an event for changing a channel output by the display device 300, an event for activating a channel recommendation function of the display device 300, an event for requesting the display device 300 to output a recommendation channel list, or the like.

Figure 4:
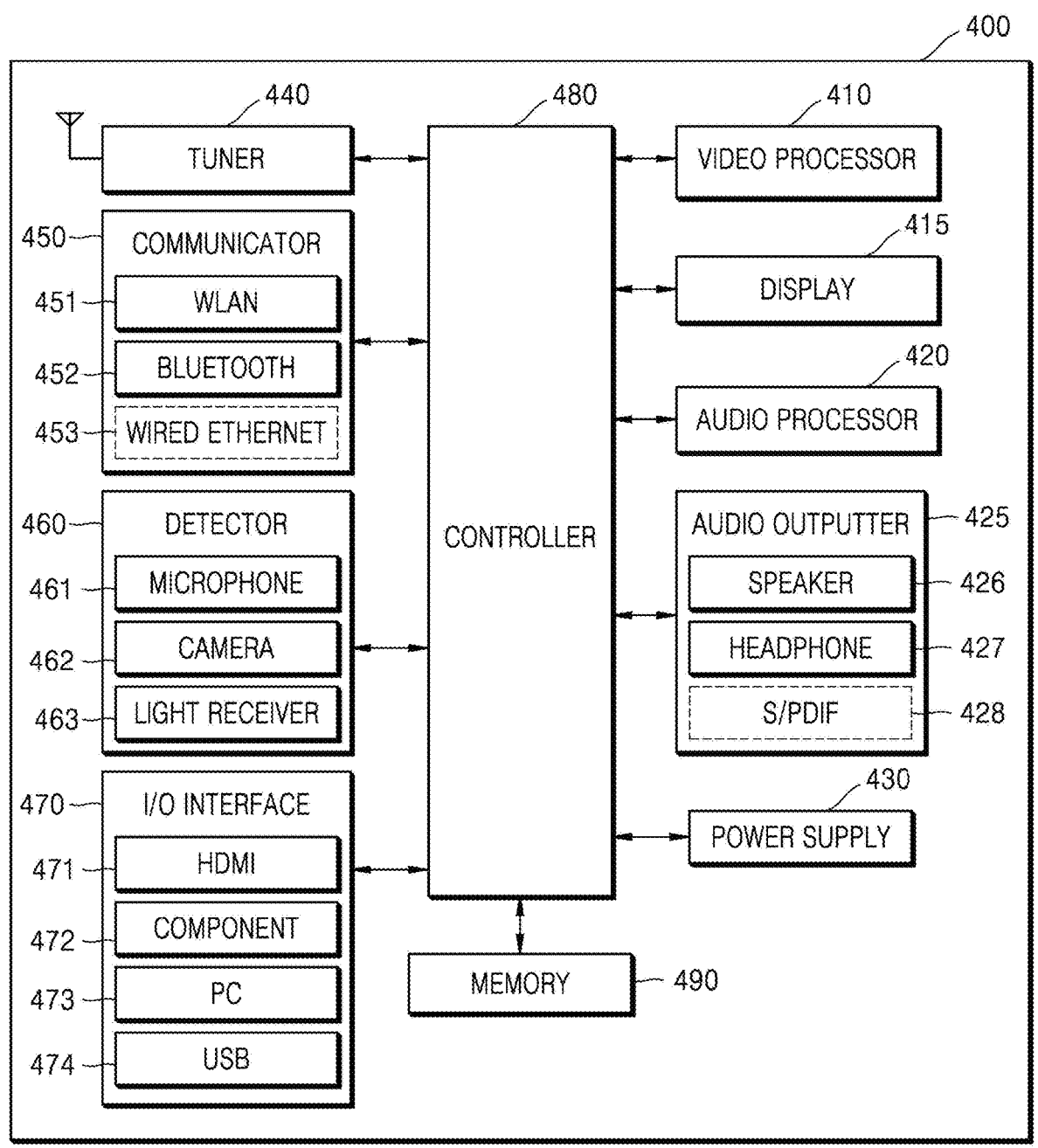
FIG. 4 is a detailed block diagram of a display device according to an embodiment of the present disclosure.

In an embodiment of the disclosure, the display device 300 may further include a detector (not shown) (corresponding to a detector 460 of FIG. 4). The detector may detect a user's voice, images, or interactions. For example, the detector may detect an interaction for turning the display device 300 on, an interaction for changing a channel output by the display device 300, an interaction for activating a channel recommendation function of the display device 300, an interaction for requesting the display device 300 to output a recommendation channel list, etc. In addition, the detector may transmit the detected interactions to the controller 220. Then, the controller 220 may determine that a certain event has occurred based on a result of the detection by the detector.

When it is determined that the certain event has occurred, the controller 220 may perform an operation of generating a recommendation channel list in response to the occurrence of the certain event.

For example, the controller 220 may generate a recommendation channel list based on viewing history information corresponding to a time point or time when the certain event occurred. Specifically, if a certain event occurs at 8 pm on Friday, Apr. 27, 2018, the controller 220 may generate a recommendation channel list at a time point or time corresponding to the time when the certain event occurred (e.g., at 8 pm on Friday, Apr. 20, 2018 that is the corresponding time in the previous week, at 8 pm on Friday, Apr. 13, 2018 that is the corresponding time in a week before the previous week, etc.), based on information about a viewing time, a channel, and a genre of content that the user viewed on the display device 300.

The operation of generating the recommendation channel list will be described in detail below with reference to FIGS. 7 to 13.

FIG. 4 is a detailed block diagram of a display device 400 according to an embodiment of the present disclosure. The display device 400 according to the embodiment of the disclosure may correspond to the display device 200 or 300 described with reference to FIGS. 1 through 3. In detail, a communicator 450 and a tuner 440, a controller 480, a display 415, and a memory 490 of the display device 400 may respectively correspond to the communicator 210, the controller 220, the display 230, and the memory 240 of the display device 200 or 300 shown in FIG. 2 or 3. Furthermore, in addition to the elements illustrated in FIG. 4, the display device 400 may further include an element corresponding to the UI 250 of FIG. 3.

Thus, descriptions that are already provided above with respect to FIGS. 1 through 3 will be omitted from the description of the display device 400.

Referring to FIG. 4, the display device 400 includes a video processor 410, the display 415, an audio processor 420, an audio outputter 425, a power supply 430, the tuner 440, the communicator 450, the detector 460, an input/output (I/O) interface 470, the controller 480, and the memory 490.

The video processor 410 processes video data received by the display device 400. The video processor 410 may perform various types of image processing, such as decoding, scaling, noise filtering, frame rate conversion, and resolution conversion, on the video data.

The controller 480 may receive a request to write the video data processed by the video processor 410, encrypt the video data, and control the encrypted video data to be written into a memory device (not shown) included in the memory 490, such as RAM (not shown).

The display 415 display, on a screen, video in a broadcast signal received via the tuner 440 according to control by the controller 480. Furthermore, the display 415 may display content (e.g., a moving image) input via the communicator 450 or the I/O interface 470.

The display 415 may output an image stored in the memory 490 according to control by the controller 480. Furthermore, the display 415 may display a voice UI (e.g., including a voice command guide) for performing a voice recognition task corresponding to voice recognition or a motion UI (e.g., including a user motion guide for motion recognition) for performing a motion recognition task corresponding to motion recognition.

The audio processor 420 processes audio data. The audio processor 420 may perform various types of processing, such as decoding, amplification, noise filtering, etc., on the audio data. Moreover, the audio processor 420 may include a plurality of audio processing modules to process audio corresponding to a plurality of pieces of content.

The audio outputter 425 outputs audio in a broadcast signal received via the tuner 440 according to control by the controller 480. The audio outputter 425 may output audio (e.g., a voice, sound) input via the communicator 450 or the I/O interface 470. Furthermore, the audio outputter 425 may output audio stored in the memory 490 according to control by the controller 480. The audio outputter 425 may include at least one of a speaker 426, a headphone output terminal 427, and a Sony/Phillips Digital Interface (S/PDIF) output terminal 428. The audio outputter 425 may include a combination of the speaker 426, the headphone output terminal 427, or the S/PDIF output terminal 428.

The power supply 430 supplies, according to control by the controller 480, power input from an external power source to the internal components 410 through 490 of the display device 400. The power supply 430 may also supply, according to control by the controller 480, power output from one or more batteries (not shown) in the display device 400 to the internal components 410 through 490.

By performing amplification, mixing, resonance, etc. of a broadcast signal received in a wired or wireless manner, the tuner 440 may tune and then select only a frequency of a channel that is to be received by the display device 400 from among many radio wave components. The broadcast signal may include audio, video, and additional information (e.g., an electronic program guide (EPG)).

In detail, the tuner 440 may selectively receive a broadcast signal and/or an image signal received in correspondence to a certain channel.

The tuner 440 may receive a broadcast signal in a frequency band corresponding to a channel number (e.g., cable broadcast 506) according to a user input. In this case, the user input may be a control signal received from an external control device (not shown) or a remote controller (not shown), such as input of a channel number, input of channel up-down, and input of a channel on an EPG screen). In addition, the user input may be an input for generating a certain event.

The tuner 440 may receive broadcast signals from various sources such as terrestrial broadcasting, cable broadcasting, satellite broadcasting, Internet broadcasting, etc. The tuner 440 may receive broadcast signals from sources such as analog broadcasting, digital broadcasting, etc. A broadcast signal received via the tuner 440 undergoes decoding (e.g., audio decoding, video decoding, or additional information decoding) to be separated into audio, video and/or additional information. The audio, video, and/or additional information may be stored in the memory 490 according to control by the controller 480.

The tuner 440 of the display device 400 may include one or a plurality of tuners. According to an embodiment of the disclosure, when the tuner 440 is configured as a plurality of tuners, a plurality of broadcast signals may be output on a plurality of windows constituting a multi-window screen provided on the display 415.

The tuner 440 may be combined with the display device 400 in the form of all-in-one or may be implemented as a separate device having a tuner electrically connected to the display device 400 (e.g., a set-top box (not shown), a tuner connected to the I/O interface 470, etc.).

The communicator 450 may connect the display device 400 to an external device (e.g., an audio device, etc.) according to control by the controller 480. The controller 480 may transmit or receive content to or from the external device connected via the communicator 450, download an application from the external device, or perform web browsing through the communicator 450. In detail, the communicator 450 may connect to a network to receive content from an external device (not shown).

As described above, the communicator 450 may include at least one of a short-range communication module (not shown), a wired communication module (not shown), and a mobile communication module (not shown).

FIG. 4 shows an example in which the communicator 450 includes one of a WLAN 451, a Bluetooth module 452, and a wired Ethernet 453.

Furthermore, the communicator 450 may include a combination of the WLAN 451, the Bluetooth module 452, and the wired Ethernet 453. In addition, the communicator 450 may receive a control signal from a control device (not shown) according to control by the controller 480. The control signal may be implemented in the form of a Bluetooth signal, an RF signal, or a Wi-Fi signal.

The communicator 450 may further include, in addition to the Bluetooth module 452, another short-range communication module (e.g., a near field communication (NFC) module) (not shown) and a separate Bluetooth Low Energy (BLE) (not shown) module.

In addition, the tuner 440 and the communicator 450 of FIG. 4 correspond to the communicator 210 of FIG. 2 and may be implemented in a form in which the communicator 450 further includes the tuner 440.

The detector 460 detects a user's voice, images, or interactions.

A microphone 461 receives a voice uttered by the user. The microphone 461 may convert the received voice into an electrical signal and output the electrical signal to the controller 480. For example, the user's voice may include a voice corresponding to a menu or function of the display device 400. For example, a recommended recognition range of the microphone 461 may be within 4 m from the microphone 461 to a user's location and may vary according to a volume of the user's voice and a surrounding environment (e.g., a speaker sound, ambient noise, etc.).

The microphone 461 may be integrated into or be separated from the display device 400. The separated microphone 461 may be electrically connected to the display device 400 via the communicator 450 or the I/O interface 470.

It will be readily understood by those of ordinary skill in the art that the display device 400 may not include the microphone 461 depending on the performance and structure of the display device 400.

A camera 462 receives an image (e.g., consecutive frames) corresponding to a user's motion including his or her gesture performed within a recognition range of the camera 462. For example, the recognition range of the camera 462 may be within 0.1 m to 5 m from the camera 462 to the user. For example, the user's motion may include a motion of a user's body part or a part of the user such as the user's face, facial expression, hand, fist, finger, etc. The camera 462 may convert the received image into an electrical signal and output the electrical signal to the controller 480 according to control by the controller 480.

The controller 480 may select a menu displayed by the display device 400 based on the received motion recognition result or perform control corresponding to the motion recognition result. For example, the control may include channel adjustment, volume adjustment, and indicator movement.

The camera 462 may include a lens (not shown) and an image sensor (not shown). The camera 462 may support an optical zoom or digital zoom by using a plurality of lenses and image processing. The recognition range of the camera 462 may be set differently according to an angle of the camera 462 and surrounding environmental conditions. When the camera 462 is configured as a plurality of cameras, the camera 462 may receive a three-dimensional (3D) still image or a 3D motion by using the plurality of cameras.

The camera 462 may be integrated into or be separated from the display device 400. A separate device (not shown) including the separated camera 462 may be electrically connected to the display device 400 via the communicator 450 or the I/O interface 470.

It will be readily understood by those of ordinary skill in the art that the display device 400 may not include the camera 462 depending on the performance and structure of the display device 400.

A light receiver 463 receives an optical signal (including a control signal) from an external control device (not shown) via a light window (not shown) on a bezel of the display 415. The light receiver 463 may receive an optical signal corresponding to a user input (e.g., touching, pressing, touch gesture, voice, or motion) from the control device. A control signal may be extracted from the received optical signal according to control by the controller 480.

For example, the light receiver 463 may receive a signal corresponding to a pointing position of the control device and transmit the received signal to the controller 480. For example, in a case where a UI screen for receiving data or commands from the user is output on the display 415, and the user desires to input data or commands to the display device 400 via a control device (not shown), the light receiver 463 may receive a signal corresponding movement of the control device when the user moves the control device while contacting a touch pad (not shown) with a finger and transmit the received signal to the controller 480. Furthermore, the light receiver 463 may receive a signal indicating that a specific button provided on the control device has been pressed and transmit the signal to the controller 480. For example, when the user presses a button-type touch pad (not shown) provided on the control device using a finger, the light receiver 463 may receive a signal indicating that the button-type touch pad has been pressed and transmit the signal to the controller 480. For example, the signal indicating that the button-type touch pad has been pressed may be used as a signal for selecting one among items.

The I/O interface 470 receives, according to control by the controller 480, video (e.g., a moving image), audio (e.g., voice, music, etc.), and additional information (e.g., an EPG) from outside of the display device 400. The I/O interface 470 may include one of an HDMI port 471, a component jack 472, a PC port 473, and a USB port 474. The I/O interface 470 may include a combination of the HDMI port 471, the component jack 472, the PC port 473, and the USB port 474.

It will be readily understood by those of ordinary skill in the art that the configuration and operation of the I/O interface 470 may be implemented in various forms according to an embodiment of the disclosure.

The controller 480 controls all the operations of the display device 400 and a flow of signals between the internal components of the display device 400 and processes data. When there is an input by the user or preset and stored conditions are satisfied, the controller 480 may execute an operating system (OS) and various applications stored in the memory 490.

The controller 480 may include a processor (not shown), RAM (not shown) that stores signals or data input from outside of the display device 400 or is used as a storage area corresponding to various operations performed by the display device 400, and ROM (not shown) that stores a control program for controlling the display device 400.

The processor may include a GPU (not shown) for processing graphics corresponding to video. The processor may be implemented as an SOC that integrates a core (not shown) with the GPU. The processor may include a single core, a dual core, a triple core, a quad core, or a multiple number of cores therein.

Furthermore, the processor may include a plurality of processors. For example, the processor may be implemented as a main processor (not shown) and a sub processor (not shown) operating in a sleep mode.

A graphics processor (not shown) generates a screen including various entities such as an icon, an image, a text, etc. by using an operator (not shown) and a renderer (not shown). The operator calculates attribute values such as coordinate values, in which the entities are to be displayed according to a layout of a screen, shapes, sizes, and colors of the entities by using user interactions detected by the detector 460. The renderer creates a screen having various layouts including the entities based on the attribute values calculated by the operator. The screen created by the renderer is displayed in a region of the display 415.

In an embodiment of the disclosure, the controller 480 may perform an operation for generating a recommendation channel list.

Hereinafter, a method of providing a recommendation channel list according to an embodiment of the disclosure and specific operations of a display device employing the method will be described with reference to the display device 300 of FIG. 3 and FIGS. 5A through 13.

FIG. 5A illustrates a user's viewing history in a first week of a preset month. For example, FIG. 5A may show a user's viewing history during a first week of April 2018.

FIG. 5A shows viewing history information 510 including information about a channel and viewing time of content that a user of the display device 300 viewed on the display device 300 in the first week of the preset month. In FIGS. 5A and 5B, channels are indicated using characters such as 'CB*'. For example, the user viewed a channel ESP* for 1 hour from 20:00 to 21:00 on Monday and then a channel GoI* for 1 hour from 22:00 to 23:00.

FIG. 5B illustrates a user's viewing history during a second week of the preset month. For example, FIG. 5B may show a user's viewing history in the second week of April, 2018.

FIG. 5B shows viewing history information 550 including information about a channel and viewing time of content that the user of the display device 300 viewed on the display device 300 in the second week of the preset month. For example, the user viewed a channel CB* for 1 hour from 20:00 to 21:00 on Monday and then channel GoI* for 1 hour from 22:00 to 23:00.

In an embodiment of the disclosure, viewing history information obtained under the control of the controller 220 may include information about a viewing time, a channel, and a genre of the content that the user viewed over the last two weeks or more based on a time when an event occurs. For example, as shown in FIGS. 5A and 5B, the controller 220 may control information about a user's viewing history for two weeks to be obtained, the two weeks being immediately before a time point when an event occurs.

In an embodiment of the disclosure, the controller 220 may analyze, by time, a degree of channel identity and a degree of genre identity with respect to content that the user viewed. In detail, the degree of genre identity may represent a genre similarity. Furthermore, the controller 220 may analyze, by day of the week, a degree of channel identity and a degree of genre identity with respect to content that the user viewed. In addition, the controller 220 may analyze, by time and day of the week, a degree of channel identity and a degree of genre identity with respect to content that the user viewed.

The controller 220 may use optical character reader (OCR) recognition, automatic content recognition (ACR), or the like to recognize a channel for content that the user viewed. For example, the controller 220 may recognize a channel for content by performing OCR or ACR on a screen itself corresponding to the content. Furthermore, when a user performs a user input for selecting a channel via the UI 250, the controller 220 may recognize the selected and viewed channel based on the user input. Furthermore, the controller 220 may match the viewed channel to time information (e.g., viewing time, day of the week, date, etc.) and store a result of the matching in the memory 240.

In addition, the controller 220 may use metadata for content that the user viewed, EPG information, etc. in order to recognize a genre of the content. For example, EPG information is a program schedule for providing viewing convenience to broadcast viewers. EPG information includes information about a title, a type, a subject, a genre, etc. of content that is a program. Thus, when EPG information corresponding to a user's viewing time is extracted, genre information of content displayed at the viewing time may be obtained.

The controller 220 may obtain viewing history information to include genre information of content.

Figure 6A:
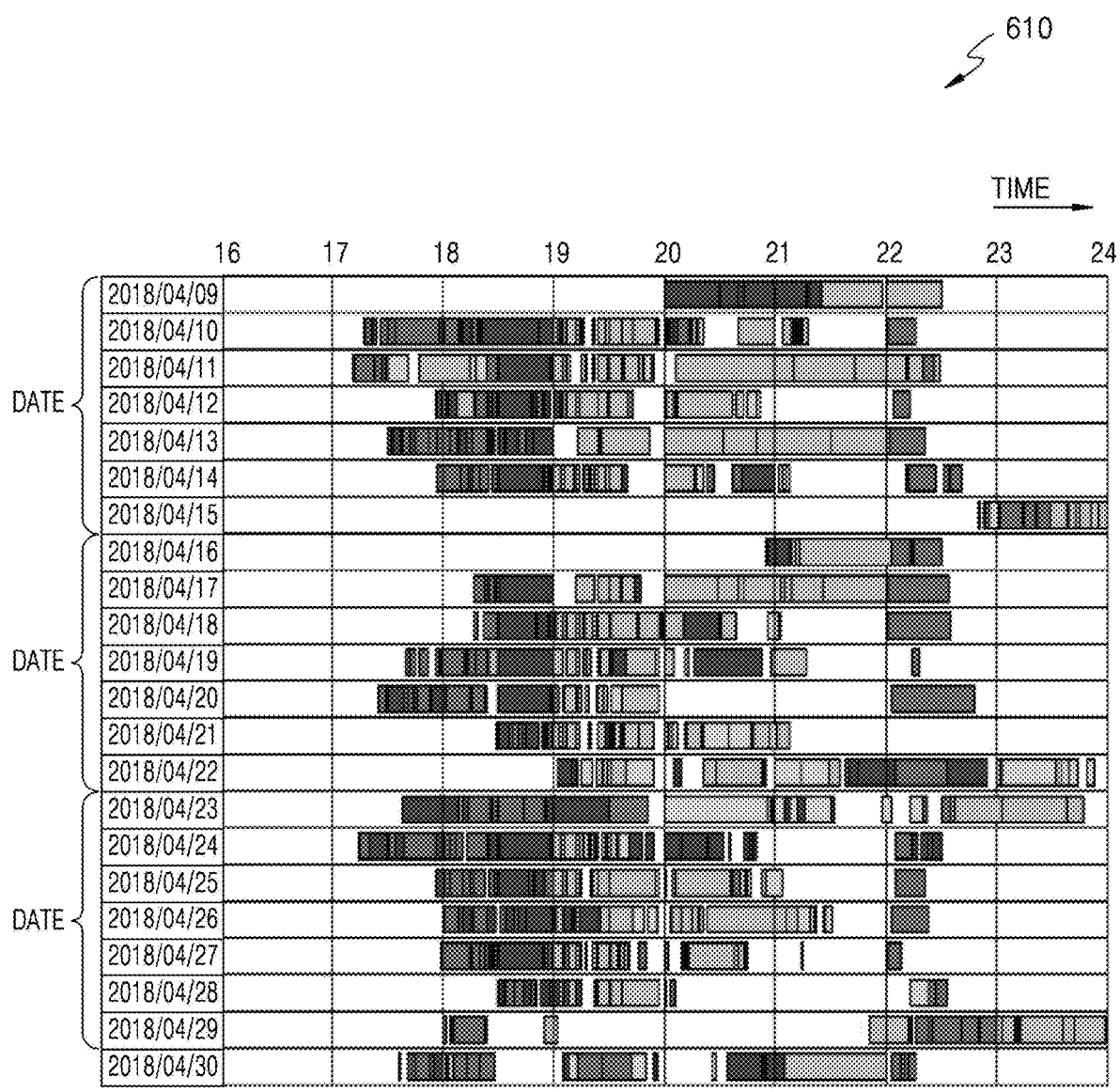
FIG. 6A is a diagram showing a user's viewing history visualized according to a genre.

FIG. 6A is a diagram showing a user's viewing history 610 visualized according to a genre.

Referring to FIG. 6A, a user's viewing history 610 for a predetermined period before a current time point is visually expressed by dividing pieces of content that the user viewed by genre. For example, in FIG. 6A, pieces of content that the user viewed may be classified according to their genres and expressed in different gray colors representing the genres. Specifically, FIG. 6A shows an example in which a plurality of genres are respectively represented in a plurality of gray colors having different grayscale values.

As another example, pieces of content that the user viewed may be classified according to their genres and expressed in different colors representing the genres.

In detail, FIG. 6A shows the user's view history in which pieces of content that the user viewed for three weeks from Apr. 9, 2018 to Apr. 30, 2018 are marked by different gray levels (or different colors) for each genre.

Figure 6B:
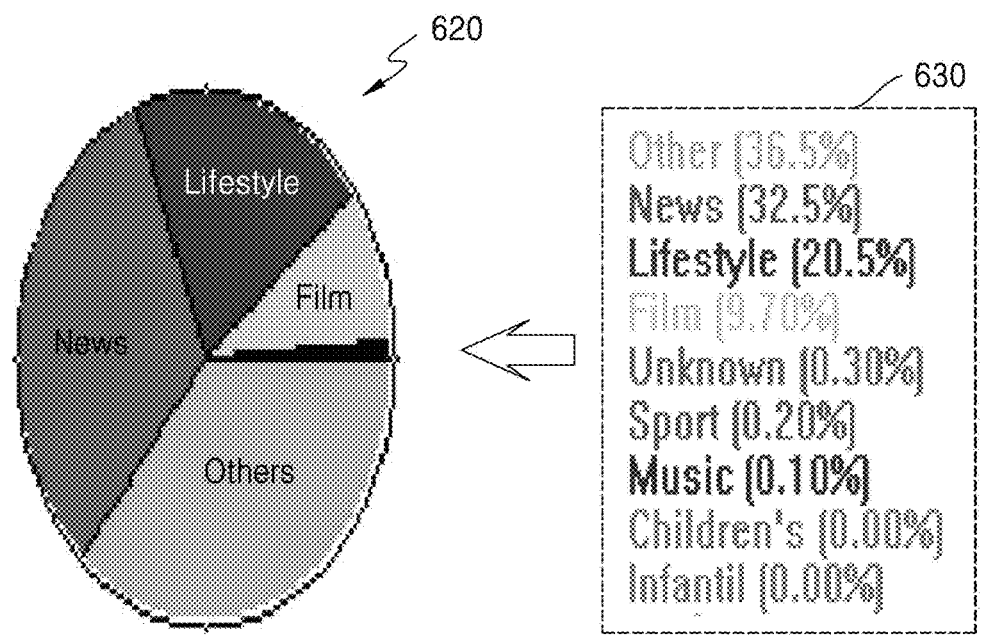
FIG. 6B is a diagram for explaining genres visualized to correspond to colors in FIG. 6A.

FIG. 6B is a diagram for explaining genres visualized to correspond to gray levels (or colors) in FIG. 6A. Referring to FIG. 6B, a pie chart 620 shows the percentage of content that the user viewed for each genre. Furthermore, a block 630 shows a matching gray level (or color) for each genre.

Referring to FIGS. 6A and 6B, genres of content may be classified as news, lifestyle, film, sports, music, children's, infantile, etc. As seen on FIGS. 6A and 6B, the user of the display device 300 had a longer viewing time for content in the order of news, lifestyle, and film except for the genre 'others' and mainly viewed content belonging to specific genres such as news, lifestyle, and film.

FIG. 7 is a flowchart for explaining operations performed by a display device, according to an embodiment of the disclosure. In addition, the flowchart in FIG. 7 is of a method 700 of providing a recommendation channel list according to an embodiment of the disclosure. The method 700 of providing a recommendation channel list according to the embodiment of the disclosure may be performed by the display device 200 or 300 according to the disclosed embodiment described with reference to FIGS. 1 through 6A, and operations performed by the display device 200 or 300 may correspond to operations of the method 700 of providing a recommendation channel list. Thus, descriptions that are already provided above with respect to FIGS. 1 through 6A will be omitted in describing the method 700 of providing a recommendation channel list.

Referring to FIG. 7, in the method 700 of providing a recommendation channel list according to the disclosed embodiment, viewing history information is acquired which includes information about a viewing time, a channel, and a genre of content that the user viewed on the display device 200 or 300 for a first period (operation S710). Operation S710 may be performed according to control by the controller 220. Furthermore, the acquired viewing history information may be stored in the memory 240 according to control by the controller 220.

In the method 700 of providing a recommendation channel list, when an event occurs, a recommendation channel list is generated based on viewing history information, the recommendation channel list including at least one channel from among at least one first recommended channel related to at least one channel viewed by the user and at least one second recommended channel related to at least one genre of content viewed by the user (operation S720) Operation S720 may be performed according to control by the controller 220.

In addition, the recommendation channel list generated in operation S720 may be output on the screen of the display 230 (operation S730). Operation S730 may be performed in the display 230 according to control by the controller 220.

FIG. 8 is another flowchart for explaining operations performed by a display device, according to an embodiment of the disclosure. Furthermore, the flowchart in FIG. 8 is of a method 800 of providing a recommendation channel list according to an embodiment of the disclosure and illustrates in more detail the method 700 of providing a recommendation channel list. The method 800 of providing a recommendation channel list according to the embodiment of the disclosure may be performed by the display device 200 or 300 according to the embodiment of the disclosure described with reference to FIGS. 1 through 6A, and operations performed by the display device 200 or 300 may correspond to operations of the method 800 of providing a recommendation channel list. In addition, operations S810, S820, and S830 included in the method 800 of providing a recommendation channel list may respectively correspond to operations S710, S720, and S730 of the method 700 of providing a recommendation channel list.

Thus, descriptions that are already provided above with respect to FIGS. 1 through 7 will be omitted from the description of the method 800 of providing a recommendation channel list.

Referring to FIG. 8, the controller 220 of the display device 300 may generate a recommendation channel list based on a degree of genre identity and a degree of channel identity with respect to at least one piece of content that the user viewed (operation S820).

In detail, according to an embodiment of the disclosure, the controller 220 may analyze, based on a user's viewing history for a first period, a degree of genre identity between at least one piece of content that the user viewed at corresponding times, and degree of channel identity between at least one piece of content that the user viewed at corresponding times. For example, by comparing and analyzing a user's viewing history on a weekly basis, the controller 220 may compare and analyze whether there is channel identity or genre identity between pieces of content viewed in the same time period on the same day of the week and respectively analyze a degree to which content on the same channel was viewed relative to a users total viewing time and a degree to which content of the same genre was viewed relative to the users total viewing time.

In detail, the controller 220 may compare, based on a users viewing history for a first period, the degree of channel identity with respect to at least one piece of content that the user viewed to the degree of genre identity with respect thereto. The controller 220 may also select, based on a result of the comparison, at least one channel from among at least one first recommended channel and at least one second recommended channel. The controller 220 may then generate a recommendation channel list including the selected at least one channel.

Specifically, the controller 220 may obtain, based on the viewing history information, a first index indicating a degree of channel identity with respect to at least one piece of content that the user of the display device 300 viewed and a second index indicating a degree of genre identity with respect to at least one piece of content that the user viewed. The controller 220 may also select, based on the first and second indices, at least one channel from among at least one first recommended channel and at least one second recommended channel. The controller 220 may then generate a recommendation channel list to include the selected least one channel.

In this case, the first index may be information numerically indicating a degree of channel identity existing between at least one piece of content that the user viewed in the same time period on the same day of the week. In addition, the second index may be information numerically indicating a degree of genre identity existing between at least one piece of content that the user viewed in the same period on the same day of the week.

For example, by comparing viewing histories for at least two or more consecutive weeks (e.g., the first and second weeks of April 2018 illustrated in FIGS. 5A and 5B), the controller 220 may determine whether content on the same channel was viewed in the same time period on the same day of the week and calculate the first index. Furthermore, by comparing viewing histories for the at least two or more consecutive weeks (e.g., the first and second weeks of April 2018 illustrated in FIGS. 5A and 5B), the controller 220 may determine whether content of the same genre was viewed in the same time period on the same day of the week and calculate the second index.

Specifically, by comparing two or more viewing histories temporally corresponding to one another, channel identity and genre identity may be respectively obtained for each preset unit time interval. In this case, a unit time interval may be set in units of 20 minutes, 30 minutes, or 1 hour. In addition, the degree of channel identity and degree of genre identity may be obtained for all time intervals in which a viewing history exists. Here, "temporally corresponding" may mean the same time interval on the same day of the week. For example, a time interval from 20:00 to 21:00 on Monday in the first week of April 2018 may correspond to a time interval from 20:00 to 21:00 on Monday of the second week of April 2018.

An example in which a users viewing history is obtained for a period of two weeks as in the example shown in FIGS. 5A and 5B is now be described in detail.

Referring to FIGS. 5A and 5B, comparison may be performed for all time intervals in any week in which a viewing history exists. A viewing history for each unit time in the first week of April 2018 may be compared with a corresponding viewing history for each unit time in the second week of April 2018. Because a viewing history is stored for each hourly period in FIGS. 5A and 5B, corresponding viewing histories for at least two weeks or more may be compared and analyzed on a per-hour basis.

Referring to FIGS. 5A and 5B, it may be determined whether identity exists by respectively comparing corresponding viewing histories for all unit time intervals in which a viewing history exists. The controller 220 may determine channel identity by comparing channel ESP* viewed in a time interval from 20:00 to 21:00 on Monday in the first week of April 2018 with channel CB* viewed in a corresponding time interval from 20:00 to 21:00 on Monday in the second week of April 2018. As a result of the determination, there is no channel identity during the time interval from 20:00 to 21:00 on Mondays in the first and second weeks of April 2018. In an embodiment of the disclosure, a case where there is channel identity may be set to 1 while a case where there is no channel identity may be set to 0.

In addition, the controller 220 may determine channel identity by comparing channel ESP* viewed in a time interval from 19:00 to 20:00 on Tuesday in the first week of April 2018 with a channel (no channel) viewed in a corresponding time interval from 19:00 to 20:00 on Tuesday in the second week of April 2018. As a result of the determination, there is no channel identity because the same channel was not viewed in the time interval from 19:00 to 20:00 on Tuesdays in the first and second weeks of April 2018.

As described above, channel identity may be respectively determined for corresponding time intervals among time intervals in which a viewing history exists, and a ratio of a time interval in which the channel identity exists with respect to a total viewing time may be calculated as a value of the first index. For example, if a sum of time intervals in which a preset viewing history exists for two weeks to be compared is 17 hours and a sum of time intervals in which channel identity exists is 12 hours, the value of the first index may be calculated as 0.7 (12/17). In detail, the 17 hours is total viewing time included in the preset viewing history.

In an embodiment of the disclosure, because the viewing history information includes genre information of the corresponding content, it may be determined whether genre identity exists between pieces of content viewed during corresponding preset time intervals. For example, CB* is a Christian broadcasting channel for which a genre may be classified as 'religion' while 'ESP*' is an American sports broadcasting channel for which a genre may be classified as 'sports'. Referring to FIGS. 5A and 5B, when a 'religion' genre of CB* which is a channel watched in a time interval from 18:00 to 19:00 on Wednesday in the first week of April 2018 is compared with a 'sports' genre of ESP* which is a channel viewed in a corresponding time interval from 18:00 to 19:00 on Wednesday in the second week of April 2018, there is no genre identity therebetween.

In an embodiment of the disclosure, a case in which there is genre identity may be set to 1 while a case in which there is no genre identity may be set to 0. Because the degree of genre identity may be calculated in the same manner as the degree of channel identity, and the second index may also be calculated in the same way as the first index, detailed descriptions thereof will be omitted herein.

In an embodiment of the disclosure, the controller 220 may compare the first index with the second index and generate a recommendation channel list by adjusting, based on a result of the comparison, the number of channels selected among the at least one first recommended channel as well as the number of channels selected among the at least one second recommended channel.

Specifically, the controller 220 may largely classify a user's viewing patterns into four patterns based on the first and second indices calculated based on information about a viewing time, a channel, and a genre of content that the user viewed. In this case, the 'viewing time' may be a concept including not only a concept of simple time but also a concept of time included in a date, a day of the week, and/or 24 hours a day.

In detail, the user's viewing patterns may be classified into (i) preferential viewing of a specific channel at a specific time, (ii) preferential viewing of content in a specific genre at a specific time, (iii) preferential viewing of at least one specific channel in a specific genre at a specific time, and (iv) viewing for a very short time such that total viewing time in the preset time period is less than a threshold time. The controller 220 may also include recommended channels optimized for each user in a recommendation channel list according to the users viewing pattern. In detail, in the case of pattern (i), because the first index has a value greater than the second index, it is determined that the user tends to usually view a preset channel for a preset time interval. In the case of pattern (ii), because the second index has a value greater than the first index, it is determined that the user tends to usually view content of a preset genre in a preset time interval. Furthermore, in the case of pattern (iii), because each of the first and second indices has a value greater than a threshold value, it is determined that the user tends to view at least one preset channel corresponding to a preset genre in a preset time interval.

In the case of the pattern (i), it is possible to generate a recommendation channel list including at least one channel that the user mainly viewed in the preset time interval. In the case of pattern (ii), it is possible to generate a recommendation channel list including a channel via which content of a genre that the user mainly viewed in the preset time interval is transmitted. Furthermore, in the case of pattern (iii), it is possible to generate a recommendation channel list including at least one channel via which content of a genre that the user mainly viewed in the preset time interval is transmitted and at least one channel that the user mainly viewed (for which a viewing history exists). In addition, in the case of pattern (iv), when a viewing time in a viewing history is less than or equal to a threshold time (e.g., 7 hours per week), because there is a high possibility that the user used the display device 200 to view only specific content, it is possible to generate a recommendation channel list including at least one channel corresponding to a genre that is the same or similar to a genre of the content for which the viewing history exists.

The display device 300 may then display a screen including the recommendation channel list generated in operation S820 (operation S830). Operation S830 may be performed in the display 230 according to control by the controller 220.

In an embodiment of the disclosure, as described above, it is possible to recommend an optimized channel according to a user's tendency of viewing considering both a channel and a genre.

Furthermore, in an embodiment of the disclosure, the degree of channel identity and degree of genre identity in a user's viewing history may be obtained by using various methods of obtaining the degree of identity between corresponding data values respectively included in two data sets.

In addition, in an embodiment of the disclosure, information indicating the degree of channel identity and degree of genre identity (e.g., the first and second indices) in a user's viewing history may be obtained by performing information processing using artificial intelligence (AI).

An AI system is a computer system that implements human-level intelligence and enables machines to become smart by learning and making decisions on their own, compared to an existing rule-based smart system. Because the AI system improves its recognition rates and is capable of understanding a user's preferences more accurately through experience, existing rule-based smart systems are increasingly being replaced by deep learning-based AI systems.

AI technology consists of machine learning (deep learning) and element technologies using the machine learning.

Machine learning is an algorithmic technique for autonomously classifying/learning features of input data, and an element technology is a technology using machine learning algorithms such as deep learning and consists of technical fields such as linguistic understanding, visual understanding, reasoning/prediction, knowledge representation, motion control, etc.

In an embodiment of the disclosure, 'AI technology related to inference and prediction techniques for performing knowledge/probability-based reasoning, optimization prediction, preference-based planning, recommendations, etc. as techniques for logically making inference and predicting outcomes by judging information' and/or 'AI technology related to knowledge representation techniques including knowledge construction (data creation/classification), knowledge management (data utilization), etc., as techniques for automatically processing experience information as knowledge data' may be used to obtain information indicating the degree of channel identity and degree of genre identity (e.g., the first and second indices).

Specifically, in an embodiment of the disclosure, the controller 220 may calculate information indicating the degree of channel identity and degree of genre identity (e.g., the first and second indices) by performing computations through a deep neural network (DNN). In this case, the DNN may perform computations for inference and prediction and/or knowledge representation according to AI technologies. In detail, DNN computations may include a convolution neural network (CNN) computation, etc. In other words, the controller 220 may implement a data recognition model via the illustrated neural network and train the implemented data recognition model by using training data. Furthermore, the controller 220 may analyze the degree of channel identity and degree of genre identity in a user's viewing pattern by using viewing history information of the user, which is data input using the trained data recognition model.

In addition, in an embodiment of the disclosure, the controller 220 may select channels that the user is more likely to prefer and generate a recommendation channel list including the selected channels by taking into account the degree of channel identity and degree of genre identity calculated by performing computations via a DNN and at least one of a channel and a genre of content that the user viewed at a time when an event occurs.

Figure 9:
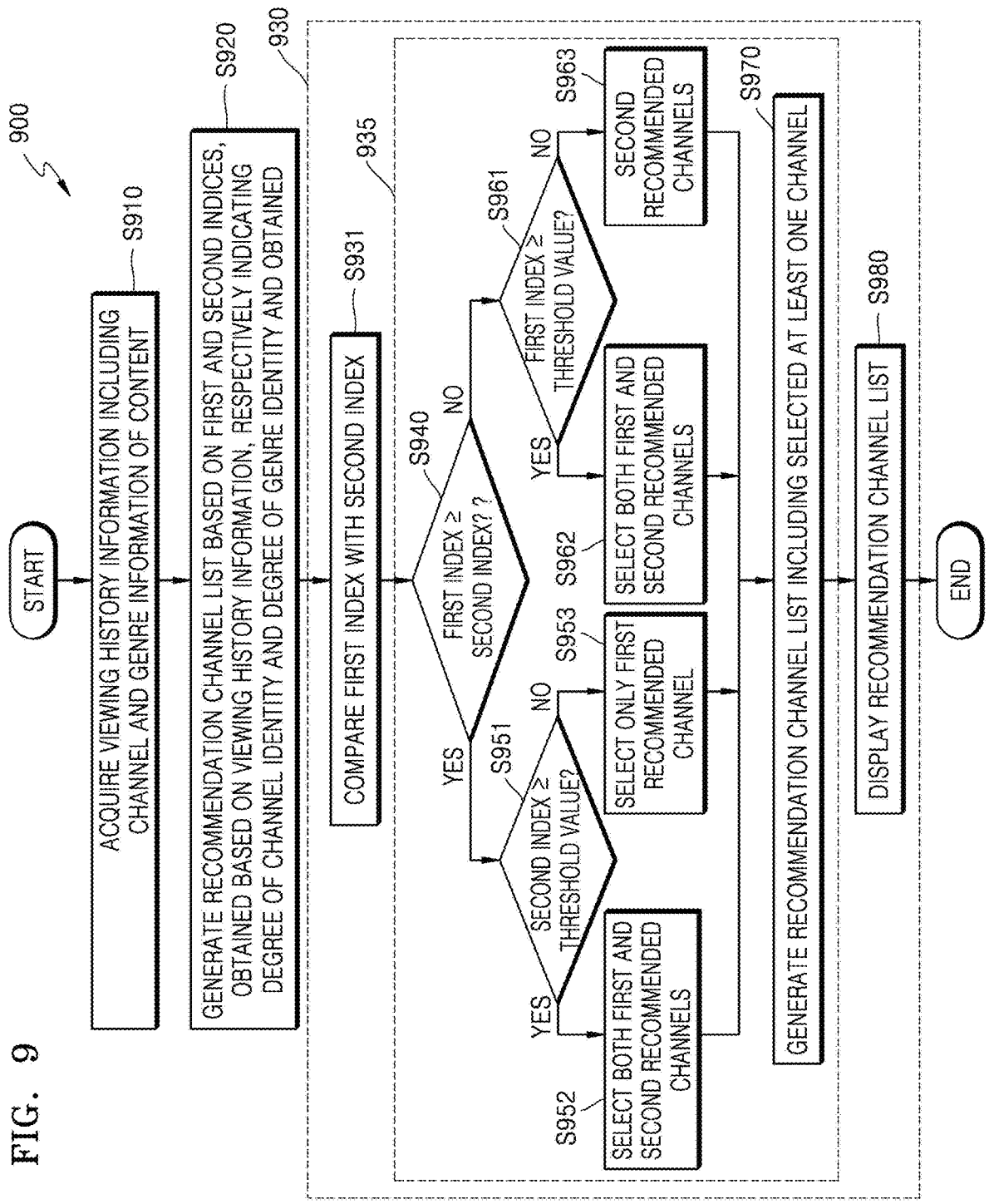
FIG. 9 is another flowchart for explaining operations performed by a display device, according to a disclosed embodiment.

FIG. 9 is another flowchart for explaining operations performed by a display device, according to an embodiment of the disclosure. FIG. 9 is another flowchart for explaining in detail operations performed by a display device, according to an embodiment of the disclosure. Furthermore, the flowchart in FIG. 8 is of a method 900 of providing a recommendation channel list according to an embodiment of the disclosure and illustrates in more detail the method 800 of providing a recommendation channel list. The method 900 of providing a recommendation channel list according to the embodiment of the disclosure may be performed by the display device 200 or 300 according to the embodiment of the disclosure described with reference to FIGS. 1 through 6A, and operations performed by the display device 200 or 300 may correspond to operations of the method 900 of providing a recommendation channel list. In addition, operations S910, S920, and S980 included in the method 900 of providing a recommendation channel list may respectively correspond to operations S810, S820, and S830 of the method 800 of providing a recommendation channel list.

Thus, descriptions that are already provided above with respect to FIGS. 1 through 8 will be omitted from the description of the method 900 of providing a recommendation channel list.

Hereinafter, operations included in operation S930 may be performed according to control by the controller 220.

Referring to FIG. 9, in the method 900 of providing a recommendation channel list, the values of first and second indices calculated in operation S920 are compared with each other (operation S931).

Then, the number of channels selected among at least one first recommended channel and the number of channels selected among at least one second recommended channel are adjusted based on a result of the comparison in operation S931 (operation S935).

Specifically, when the first index has a value that is greater than or equal to or exceeds a threshold value, the controller 220 may select at least one channel to be included in a recommendation channel list from among at least one first recommended channel and create the recommendation channel list including the selected channel.

Furthermore, when the second index has a value that is greater than or equal to or exceeds a threshold value, the controller 220 may select at least one channel to be included in the recommendation channel list from among at least one second recommended channel and create the recommendation channel list including the selected channel.

In addition, when each of the first and second indices has a value that is greater than or equal to or exceeds a threshold value, the controller 220 may determine the number of channels to be selected from among the at least one first channel based on the value of the first index and the number of channels to be selected from among the at least one second channel based on the value of the second index. The controller 220 may also create a recommendation channel list according to the determined number of channels.

Here, the 'preset threshold value' to be compared with the first index is a reference value used to determine that there is a tendency to view a specific channel in a user's viewing pattern and may be experimentally optimized and set. Furthermore, the 'preset threshold value' to be compared with the second index is a reference value used to determine there is a tendency to view content of a specific genre in the user's viewing pattern and may be experimentally optimized and set. For example, the display device 200 may receive a satisfaction level for a recommendation channel list from the user and may modify and set a threshold value in a direction such that the level of user satisfaction is increased. Furthermore, when the value of the first index is greater than or equal to the preset threshold value, it may be determined that it is necessary to recommend, to the user, channels related to a channel for which a viewing history exists. Furthermore, when the value of the second index is greater than or equal to the preset threshold value, it may be determined that it is necessary to recommend, to the user, channels related to a genre of content for which a viewing history exists.

In addition, when a viewing time in the viewing history existing for a first period is less than or equal to a threshold time, the controller 220 may generate the recommendation channel list based on a genre corresponding to the content viewed by the user.

Referring to FIG. 9, the controller 220 compares the value of the first index with the value of the second index (operation S931). It may be determined whether the value of the first index is greater than or equal to or exceeds the value of the second index in order to determine whether the user tends to preferentially view a specific channel or preferentially view a specific genre (operation S940).

When the value first index is greater than or equal to or exceeds the value of the second index, it may be determined that the user has a strong tendency to prefer the specific channel over the specific genre. Furthermore, when the value of the first index is less than or does not exceed the value of the second index, it may be determined that the user has a strong tendency to prefer the specific genre over the specific channel.

Subsequently to operation S940, when the value of the first index is greater than or equal to or exceeds the value of the second index, it may be determined whether the value of the second index is greater than or equal to or exceeds the preset threshold value (operation S951). Even if the value of the first index is greater than or equal to or exceeds the value of the second index, when the value of the second index is greater than or equal to or exceeds the preset threshold value, it is necessary to provide channels related to a genre for which a user's viewing history exists as recommended channels. Thus, when it is determined in operation S951 that the value of the second index is greater than or equal to or exceeds the preset threshold value, the recommendation channel list may be generated by selecting recommended channel items to all include at least one first recommended channel and at least one second recommended channel (operation S952). When it is determined in operation S951 that the value of the second index is less than or does not exceed the preset threshold value, channels related to a genre for which a user's viewing history exists may not be selected as recommended channels while only the at least one first recommended channel may be selected as recommended channels to be included in the recommendation channel list (operation S953).

Subsequently to operation S940, on the other hand, when the value of the first index is less than or does not exceed the value of the second index, it may be determined whether the value of the first index is greater than or equal to or exceeds the preset threshold value (operation S961). Even if the value of the first index is less than or does not exceed the value of the second index, when the value of the first index is greater than or equal to or exceeds the preset threshold value, it is necessary to provide channels related to a channel for which a user's viewing history exists as recommended channels. Thus, when it is determined in operation S961 that the value of the first index is greater than or equal to or exceeds the preset threshold value, the recommendation channel list may be generated by selecting recommended channel items to include all of the at least one first recommended channel and the at least one second recommended channel (operation S962). When it is determined in operation S961 that the value of the first index is less than or does not exceed the preset threshold value, channels related to a channel for which a user's viewing history exists may not be selected as recommended channel items while only the at least one second recommended channel may be selected as recommended channel items to be included in the recommendation channel list (operation S963).

Furthermore, the recommendation channel list composed of the selected recommended channel items may be generated (S970).

Then, the recommendation channel list generated in operation S970 may be displayed (operation S980).

Screens, each including a channel list according to a disclosed embodiment, will now be described with reference to FIGS. 10 through 13.

Figure 10:
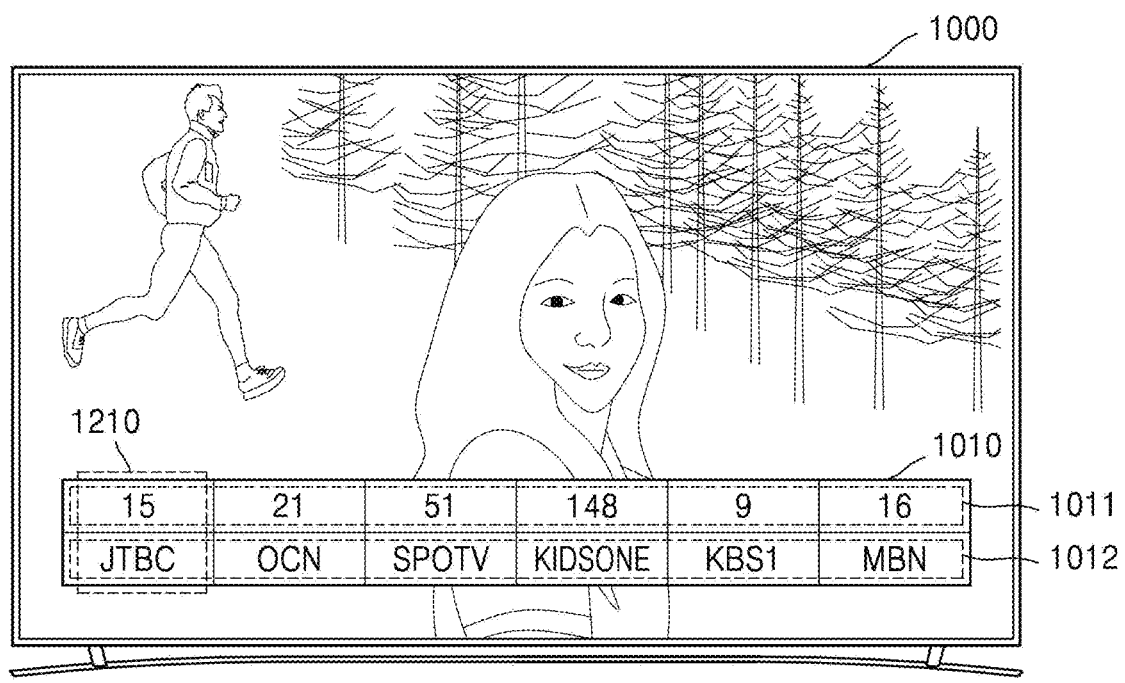
FIG. 10 illustrates a screen including a channel list provided in a disclosed embodiment, according to an embodiment.

FIG. 10 illustrates a screen including a channel list provided in a disclosed embodiment, according to an embodiment.

Referring to FIG. 10, the controller 220 may control the display 230 to output a screen 1000 including a recommendation channel list 1010.

The recommendation channel list 1010 may include channel numbers 1011 and channel names 1012 corresponding thereto.

In addition, the controller 220 may arrange channels included in the recommendation channel list 1010 in an order from highest to lowest in a ratio of time included in a user's total viewing time according to a user's viewing history. Alternatively, the controller 220 may arrange the channels selected to be included in the recommendation channel list 1010 in a descending order of their rating by reflecting real-time viewing information.

Alternatively, the controller 220 may generate a recommendation channel list by applying different sizes, colors, shapes, and marking methods to channels selected to be included in the recommendation channel list 1010.

Figure 11:
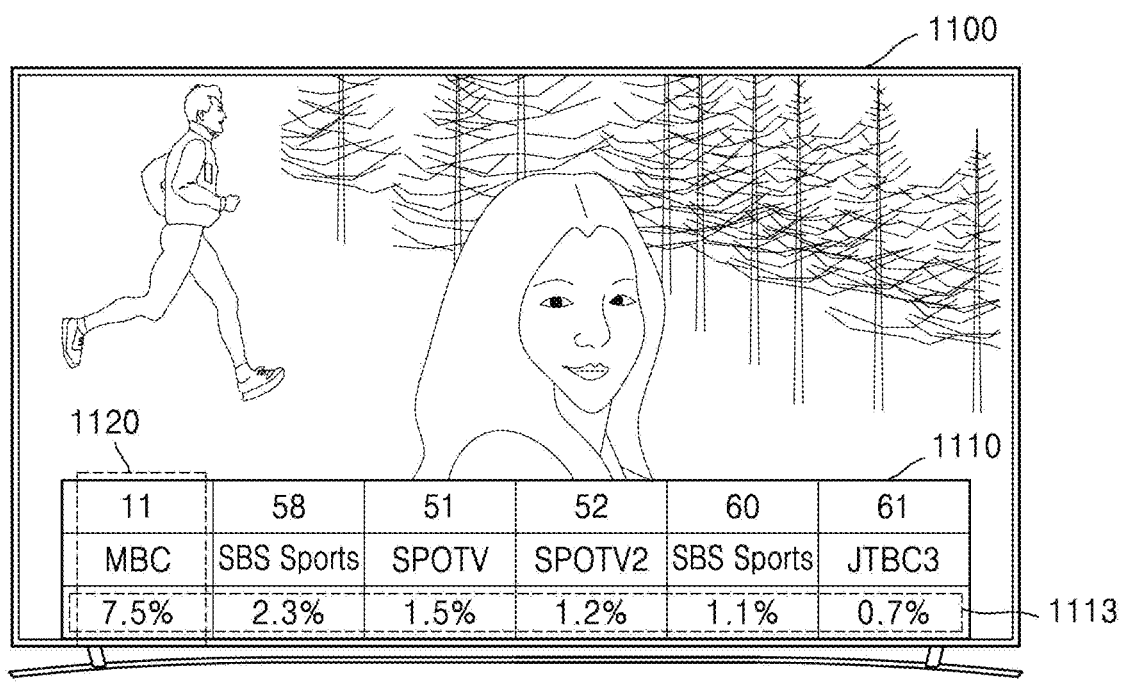
FIG. 11 illustrates a screen including a channel list provided in a disclosed embodiment, according to another embodiment.

FIG. 11 illustrates a screen including a channel list provided in a disclosed embodiment, according to another embodiment.

Referring to FIG. 11, the controller 220 may control the display 230 to output a screen 1100 including a recommendation channel list 1110.

The recommendation channel list 1110 may include channel numbers, channel names corresponding to the channel numbers, and viewing ratings 1113 corresponding thereto. For example, a first item among items included in the recommendation channel list 1110 may include a channel number 11, a channel name MBC, and information about a rating of 7.5% for a corresponding channel.

For example, in the case of a user having a strong viewing pattern for a specific genre, only a second recommended channel may be included in the recommendation channel list as in operation S963. In this case, it is assumed that a genre that is the same or similar to a genre of content that the user viewed at a time corresponding to a time when an event is input is a 'sports' genre. Then, the controller 220 may select channels related to the sports genre, such as MBC, SBS Sports, SPOTV, SPOTV2, Star Sports, and JTBC3 and arrange the selected channels in the order of their popularity to generate a recommendation channel list. In this case, even a channel for which a user's viewing history does not exist may be output as a recommended channel due to a genre similarity. Since the user is classified as a user with a high preference for the sports genre, the user may be interested in a new channel corresponding to the sports genre. Thus, a favorite channel list that better suits a user's preference and viewing tendency may be provided.

Figure 12:
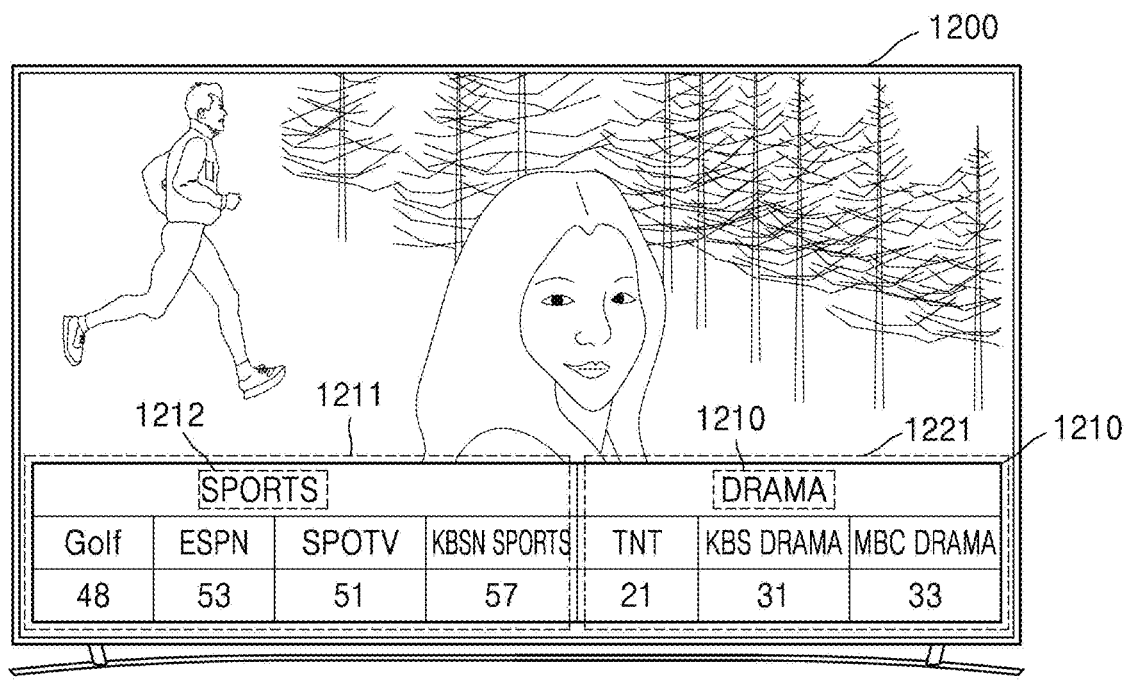
FIG. 12 illustrates a screen including a channel list provided in a disclosed embodiment, according to another embodiment.

FIG. 12 illustrates a screen including a channel list provided in a disclosed embodiment, according to another embodiment.

Referring to FIG. 12, the controller 220 may control the display 230 to output a screen 1200 including a recommendation channel list 1210.

For example, in the case of a user having a strong viewing pattern for a specific genre, a second recommended channel may be included in the recommendation channel list 1210 as in operations S952 and S963. In this case, it is assumed that genres that are the same or similar to a genre of content that the user viewed at a time corresponding to a time when an event is input are 'sports' and 'drama' genres. In this case, a favorite channel list may be provided to all include at least one second recommended channel 1211 corresponding to a 'sports' genre 1212 and at least one second recommended channel 1221 corresponding to a 'drama' genre 1222.

Figure 13:
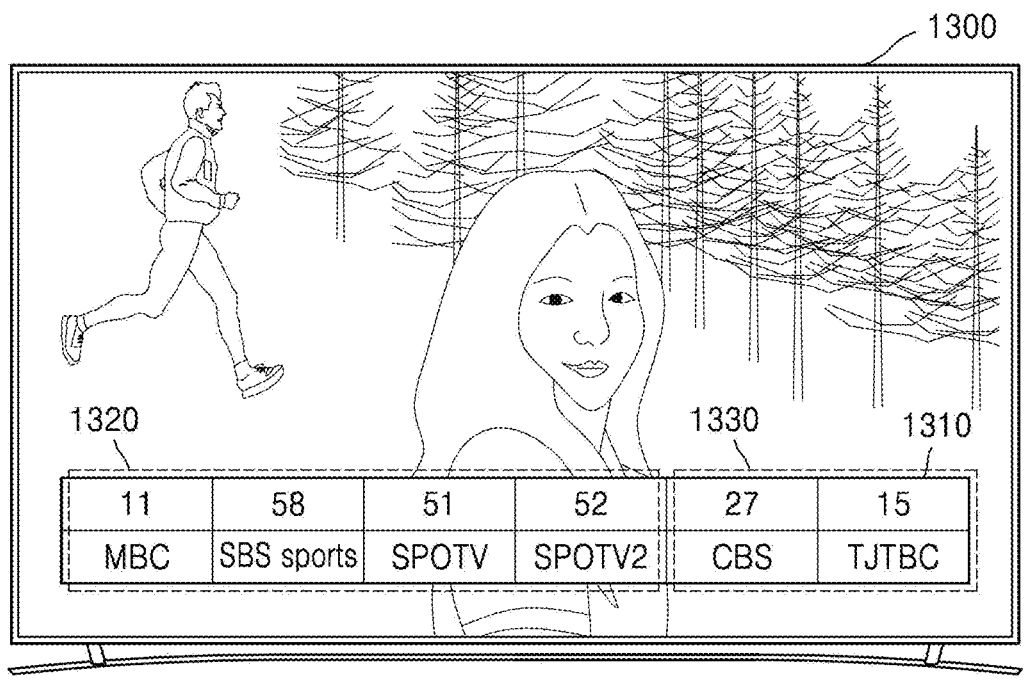
FIG. 13 illustrates a screen including a channel list provided in a disclosed embodiment, according to another embodiment.

FIG. 13 illustrates a screen including a channel list provided in a disclosed embodiment, according to another embodiment.

Referring to FIG. 13, the controller 220 may control the display 230 to output a screen 1300 including a recommendation channel list 1310.

For example, in the case of a user having both a viewing pattern for a specific genre and a viewing pattern for a specific channel, at least one first recommended channel 1330 and at least one second recommended channel 1320 may be included in the recommendation channel list 1310 as in operations S952 and S962. Specifically, when a genre that is the same or similar to a genre of content that the user viewed at a time corresponding to a time when an event is input is a 'sports' genre, the at least one second recommended channel 1320 corresponding to the sports genre may be included in the recommendation channel list 1310. In addition, channels 1330 related to a channel viewed by the user at a time corresponding to a time when a predetermined event is input may be included in the recommendation channel list 1310.

A method of providing a recommendation channel list according to an embodiment of the present disclosure may be implemented in the form of program instructions executable by various types of computers and may be recorded on computer-readable recording media. Furthermore, according to an embodiment of the disclosure, computer-readable recording media having recorded thereon one or more programs including instructions for executing a method, performed by a display device, of providing a recommendation channel list may be provided.

The computer-readable recording media may include program instructions, data files, data structures, etc. either alone or in combination. The program instructions recorded on the computer-readable recording media may be designed and configured specially for the present disclosure or may be known to and be usable by those skilled in the art of computer software. Examples of the computer-readable recording media include magnetic media such as hard disks, floppy disks, and magnetic tapes, optical media such as compact disk-ROM (CD-ROM) and digital versatile disks (DVDs), magneto-optical media such as floptical disks, and hardware devices that are specially configured to store and perform program instructions, such as ROM, RAM, flash memory, etc. Examples of program instructions include not only machine code such as that generated by a compiler but also higher level language code executable by a computer using an interpreter or the like.

Furthermore, the method, performed by the display device, of providing a recommendation channel list, according to the embodiment of the disclosure may be implemented as a computer program product including a recording medium having stored therein a program for performing operations of: obtaining a sentence in multiple languages; and using a multilingual translation model to obtain vector values respectively corresponding to words in the multilingual sentence, convert the obtained vector values to vector values corresponding to a target language, and obtain a sentence in the target language based on the resulting vector values.

While embodiments have been particularly described with reference to the figures, it will be understood that the scope of the present disclosure is not limited to the embodiments and various changes and modifications made by one of ordinary skill in the art based on the basic concept of the present disclosure also fall within the scope as defined by the following claims.

The invention claimed is:

1. A method of providing a recommendation channel list, the method comprising:
    acquiring information of a viewing history, wherein the information of the viewing history includes information about a viewing time, a channel, and a genre of content that a user viewed on a display device for a first time period;
    in response to an event being occurred, generating, based on the information of the viewing history, a recommendation channel list including at least one channel selected from among at least one first recommended channel related to at least one channel viewed by the user and at least one second recommended channel related to at least one genre of the content viewed by the user;
    displaying a screen including the recommendation channel list;
    receiving, from a user, a selection of a channel from the recommendation channel list; and
    displaying the channel selected by the user,
    wherein the generating of the recommendation channel list comprises:
        obtaining a value indicating a degree of genre identity and a value indicating a degree of channel identity with respect to at least one piece of content that the user viewed for the time period;
        based on the value indicating the degree of channel identity being greater than the value indicating the degree of genre identity for the time period, generating the recommendation channel list including at least one channel that the user viewed in the time period; and
        based on the value indicating the degree of genre identity being greater than the value indicating the degree of channel identity for the time period, generating the recommendation channel list including at least one channel via which content of the genre that the user viewed in the time period is transmitted.

2. The method of claim 1, wherein the generating of the recommendation channel list comprises:
    comparing the degree of channel identity with the degree of genre identity, and
    selecting, based on a result of the comparing, the at least one channel from among the at least one first recommended channel and the at least one second recommended channel; and
    generating the recommendation channel list including the selected at least one channel.

3. The method of claim 1, wherein the generating of the recommendation channel list comprises:
    obtaining, based on the information of the viewing history, a first index indicating a degree of channel identity between pieces of content that the user viewed and a second index indicating a degree of genre identity between the pieces of the content that the user viewed;
    selecting, based on the first and second indices, at least one channel from among the at least one first recommended channel and the at least one second recommended channel; and
    generating the recommendation channel list including the selected at least one channel.

4. The method of claim 3, wherein the first index is information numerically indicating the degree of channel identity between the pieces of the content that the user viewed, and
    the second index is information numerically indicating the degree of genre identity between the pieces of the content that the user viewed,
    wherein the pieces of the content include a first piece of content that the user viewed in a specific period on a specific day of a week, and a second piece of content that the user viewed in the specific period on the specific day of another week.

5. The method of claim 3, wherein the selecting of the at least one channel comprises comparing the first index with the second index and adjusting, based on a result of the comparing, the number of channels that are selected among the at least one first recommended channel and the number of channels that are selected among the at least one second recommended channel.

6. The method of claim 3, wherein the selecting of the at least one channel comprises, when the first index has a value that is greater than or equal to a threshold value, selecting at least one channel to be included in the recommendation channel list from among the at least one first recommended channel.

7. The method of claim 3, wherein the selecting of the at least one channel comprises, when the second index has a value that is greater than or equal to a threshold value, selecting at least one channel to be included in the recommendation channel list from among the at least one second recommended channel.

8. The method of claim 5, wherein the selecting of the at least one channel comprises, when each of the first and second indices has a value that is greater than or equal to a threshold value, determining the number of channels to be selected from among the at least one first channel based on the value of the first index and the number of channels to be selected from among the at least one second channel based on the value of the second index.

9. The method of claim 1, wherein the generating of the recommendation channel list comprises, when the viewing time for the time period is less than or equal to a threshold time, generating the recommended channel based on a genre corresponding to the content that the user viewed.

10. A display device comprising:
a display;
a communicator configured to receive at least one of a plurality of pieces of content respectively corresponding to a plurality of channels;
a memory storing one or more instructions;
a user interface; and
a controller including at least one processor configured to execute at least one of the one or more instructions, wherein
the controller is configured to:
acquire information of a viewing history, wherein the information of the viewing history includes information about a viewing time, a channel, and a genre of content that a user viewed for a time period;
in response to an event being occurred, generate, based on the information of the viewing history, a recommendation channel list including at least one channel selected from among at least one first recommended channel related to at least one channel viewed by the user and at least one second recommended channel related to at least one genre of the content viewed by the user;
control a screen including the recommendation channel list to be output on the display;
receive, through the user interface, a selection of a channel from the recommendation channel list; and
control the channel selected by the user to be output on the display,
wherein the generating of the recommendation channel list comprises:
obtaining a value indicating a degree of genre identity and a value indicating a degree of channel identity with respect to at least one piece of content that the user viewed for the time period;
based on the value indicating the degree of channel identity being greater than the value indicating the degree of genre identity for the time period, generating the recommendation channel list including at least one channel that the user viewed in the time period; and
based on the value indicating the degree of genre identity being greater than the value indicating the degree of channel identity for the time period, generating the recommendation channel list including at least one channel via which content of the genre that the user viewed in the time period is transmitted.

11. The display device of claim 10, wherein the controller is further configured to:
obtain, based on the information of the viewing history, a first index indicating a degree of channel identity between pieces of content that the user viewed and a second index indicating a degree of genre identity between the pieces of the content that the user viewed;
select, based on the first and second indices, at least one channel from among the at least one first recommended channel and the at least one second recommended channel; and
generate the recommendation channel list including the selected at least one channel.

12. The display device of claim 10, wherein the controller is further configured to control the information of the viewing history to be stored in the memory.

13. The display device of claim 10, wherein the controller is further configured to:
compare the degree of channel identity with the degree of genre identity, and
select, based on a result of the comparing, the at least one channel from among the at least one first recommended channel and the at least one second recommended channel; and
generate the recommendation channel list including the selected at least one channel.

14. The display device of claim 11, wherein the first index is information numerically indicating the degree of channel identity between the pieces of the content that the user viewed, and the second index is information numerically indicating the degree of genre identity between the pieces of the content that the user viewed, and
wherein the pieces of the content include a first piece of content that the user viewed in a specific period on a specific day of a week, and a second piece of content that the user viewed in the specific period on the specific day of another week.

15. The display device of claim 11, wherein the controller is further configured to compare the first index with the second index and adjust, based on a result of the comparing, the number of channels that are selected among the at least one first recommended channel and the number of channels that are selected among the at least one second recommended channel.

16. The display device of claim 11, wherein the controller is further configured to, when the first index has a value that is greater than or equal to a threshold value, select at least one channel to be included in the recommendation channel list from among the at least one first recommended channel.

17. The display device of claim 11, wherein the controller is further configured to, when the second index has a value that is greater than or equal to a threshold value, selecting at least one channel to be included in the recommendation channel list from among the at least one second recommended channel.

* * * * *